(12) United States Patent
Yamashita et al.

(10) Patent No.: US 10,565,137 B2
(45) Date of Patent: Feb. 18, 2020

(54) NON-VOLATILE MEMORY DEVICE AND CONTROLLING APPARATUS, HAVING EXTENSION ACTIVATING AND CONTROL PARTS, WHERE MEMORY DEVICE CAN BE OPERATED IN AN OPTIMUM OPERATION MODE

(75) Inventors: Hideaki Yamashita, Kyoto (JP); Takeshi Ootsuka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 615 days.

(21) Appl. No.: 12/501,894

(22) Filed: Jul. 13, 2009

(65) Prior Publication Data

US 2010/0017541 A1 Jan. 21, 2010

(30) Foreign Application Priority Data

Jul. 15, 2008 (JP) ................................ 2008-184044

(51) Int. Cl.
*G06F 13/28* (2006.01)
*G06F 3/00* (2006.01)
*G06F 13/16* (2006.01)

(52) U.S. Cl.
CPC ............................... *G06F 13/1694* (2013.01)

(58) Field of Classification Search
CPC ................................................. G06F 13/1694
USPC ............................................... 710/14, 22, 52
See application file for complete search history.

(56) References Cited

U.S. PATENT DOCUMENTS

| | | | | |
|---|---|---|---|---|
| 5,604,843 A * | 2/1997 | Shaw et al. | ..................... | 358/1.1 |
| 5,630,171 A * | 5/1997 | Chejlava et al. | ............... | 710/23 |
| 5,815,734 A * | 9/1998 | Lee et al. | .......................... | 710/60 |
| 5,822,251 A * | 10/1998 | Bruce et al. | ............. | 365/185.33 |
| 6,240,480 B1 * | 5/2001 | Wong et al. | ................... | 710/311 |
| 2002/0004864 A1 | 1/2002 | Kubota | | |
| 2004/0066673 A1 * | 4/2004 | Perego | ................. | G11C 7/1051 365/200 |
| 2006/0209196 A1 | 9/2006 | Ohtsuka et al. | | |
| 2007/0180186 A1 * | 8/2007 | Cornwell et al. | ............. | 711/103 |
| 2008/0189452 A1 * | 8/2008 | Merry et al. | ..................... | 710/56 |

(Continued)

FOREIGN PATENT DOCUMENTS

| | | |
|---|---|---|
| JP | 08-328763 | 12/1996 |
| JP | 2001-356885 | 12/2001 |

(Continued)

*Primary Examiner* — Idriss N Alrobaye
*Assistant Examiner* — Brooke J Taylor
(74) *Attorney, Agent, or Firm* — Hamre, Schumann, Mueller & Larson, P.C.

(57) ABSTRACT

A memory device controlling apparatus of the present invention includes a device information requesting part that requests device information with respect to a memory device, when recognizing that the memory device is connected to the memory device controlling apparatus, and an extension activating part that activates an extension of the memory device based on the device information acquired in the device information requesting part. The memory device controlling apparatus accesses the memory device using the extension in the memory device. Such a configuration enables the memory device and the memory device controlling apparatus to be operated in an optimum operation mode in accordance with the characteristics of each bus, a host PC, and the memory device.

2 Claims, 16 Drawing Sheets

(56) References Cited

U.S. PATENT DOCUMENTS

| | | | | |
|---|---|---|---|---|
| 2009/0006691 | A1* | 1/2009 | Eggleston | G06F 13/1678 |
| | | | | 710/113 |
| 2009/0037641 | A1* | 2/2009 | Bresniker | 711/100 |
| 2009/0292838 | A1* | 11/2009 | Wong | G06F 16/51 |
| | | | | 710/52 |
| 2009/0327794 | A1* | 12/2009 | Kapil | G06F 1/3203 |
| | | | | 713/600 |
| 2011/0016248 | A1* | 1/2011 | Takahashi | 710/301 |

FOREIGN PATENT DOCUMENTS

| | | | | |
|---|---|---|---|---|
| JP | 2004-046498 | | 2/2004 | |
| JP | 2004-343682 | | 12/2004 | |
| JP | 2006-018419 | | 1/2006 | |
| JP | 2006-195948 | A | 7/2006 | |
| JP | 2008003820 | * | 1/2008 | G06K 19/07 |

* cited by examiner

NON-VOLATILE MEMORY DEVICE AND CONTROLLING APPARATUS, HAVING EXTENSION ACTIVATING AND CONTROL PARTS, WHERE MEMORY DEVICE CAN BE OPERATED IN AN OPTIMUM OPERATION MODE

BACKGROUND OF THE INVENTION

1. Field of the Invention

The present invention relates to a memory device and a memory device controlling apparatus.

2. Description of Related Art

A memory device contains a semiconductor memory element capable of storing data. A memory device controlling apparatus can be connected to a memory device. The memory device controlling apparatus is capable of writing data onto a memory device and reading data therefrom.

Conventional memory device and memory device controlling apparatus include buses respectively. The bus of the memory device and the bus of the memory device controlling apparatus are operated at different speeds.

JP 2006-195948 A discloses bus bridges enabling the transfer of data between buses operated at different speeds. The bus bridges are adaptable to a plurality of various frequencies and connected in parallel between the buses. The selection of a bus bridge depending upon the relationship between clock frequencies of both the buses enables data to be transferred between two different buses even when the buses are operated at different speeds.

FIG. 25 is a block diagram of conventional memory device and memory device controlling apparatus. A host PC 101 is an information processing apparatus typified by a personal computer or the like. A memory device 103 contains a non-volatile memory such as a flash memory. An adaptor 102 is capable of connecting the host PC 101 to the memory device 103. The adaptor 102 includes a first bus bridge 2221, a second bus bridge 2222, a third bus bridge 2223, a fourth bus bridge 2224, a first selecting part 2231, and a second selecting part 2232. The first bus bridge 2221, the second bus bridge 2222, the third bus bridge 2223, and the fourth bus bridge 2224 are operated respectively at different frequencies. The first selecting part 2231 is capable of selecting a bus bridge in accordance with the operation frequency of the host PC 101. The second selecting part 2232 is capable of selecting a bus bridge in accordance with the operation frequency of the memory device 103.

However, the memory device and the memory device controlling apparatus shown in FIG. 25 cannot be operated in an optimum operation mode in accordance with the characteristics of each bus, the host PC 101, and the memory device 103.

SUMMARY OF THE INVENTION

Therefore, with the foregoing in mind, it is an object of the present invention to provide a memory device and a memory device controlling apparatus that can be operated in an optimum operation mode in accordance with the characteristics of each bus, a host PC, and the memory device.

A first memory device controlling apparatus of the present invention enables a memory device to be connected thereto, and includes a device information requesting part that requests device information with respect to the memory device, when recognizing that the memory device is connected to the memory device controlling apparatus, and an extension activating part that activates an extension of the memory device based on the device information acquired in the device information requesting part, wherein the memory device controlling apparatus accesses the memory device using the extension in the memory device.

A second memory device controlling apparatus of the present invention includes a host appliance and an adaptor and is capable of controlling a memory device. The host appliance includes an operation constraint notifying part that notifies the adaptor of an operation constraint, and the adaptor includes an extension selecting part that selects an extension to be activated, based on the operation constraint from the operation constraint notifying part and device information acquired from the memory device.

A memory device of the present invention is capable of being connected to a memory device controlling apparatus through an interface, and includes an extension control part that controls an extension of the memory device and a device information notifying part that notifies the memory device controlling apparatus of device information with respect to a request from the memory device controlling apparatus, wherein the extension control part activates the extension with respect to a request of activating the extension from the memory device controlling apparatus.

According to the present invention, the memory device and the memory device controlling apparatus can be operated in an optimum operation mode in accordance with the characteristics of each bus, a host PC, and the memory device.

DETAILED DESCRIPTION OF THE INVENTION

Figure 1:
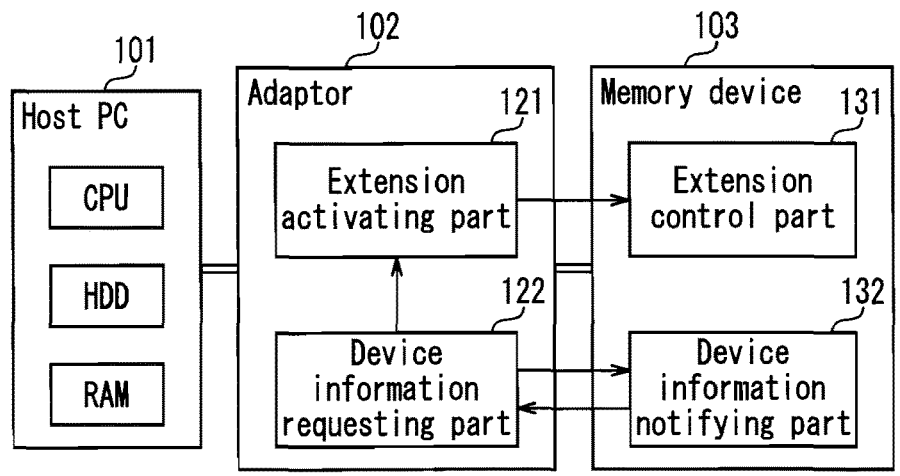
FIG. 1 is a block diagram of a memory device and a memory device controlling apparatus according to Embodiment 1.

A first memory device controlling apparatus of the present invention enables a memory device to be connected thereto, and includes a device information requesting part that requests device information with respect to the memory device, when recognizing that the memory device is connected to the memory device controlling apparatus, and an extension activating part that activates an extension of the memory device based on the device information acquired in the device information requesting part, wherein the memory device controlling apparatus accesses the memory device using the extension in the memory device.

A second memory device controlling apparatus of the present invention includes a host appliance and an adaptor, and is capable of controlling a memory device, wherein the host appliance includes an operation constraint notifying part that notifies the adaptor of an operation constraint to be satisfied, and the adaptor includes an extension selecting part that selects an extension to be activated, based on the operation constraint from the operation constraint notifying part and device information acquired from the memory device.

The memory device controlling apparatus of the present invention takes the following aspects based on the above configuration.

In the memory device controlling apparatus of the present invention, the extension activating part determines whether or not the device information acquired by the device information requesting part contains extension information, and when the device information contains the extension information, the memory device controlling apparatus accesses the memory device using the extension in the memory device.

In the memory device controlling apparatus of the present invention, the device information requesting part receives a maximum data bus width as device information, and the extension activating part requests an operation at the maximum data bus width.

In the memory device controlling apparatus of the present invention, the device information requesting part receives a striping configuration as device information and manages an internal buffer with a striping size.

The memory device controlling apparatus of the present invention further includes an extension selecting part that selects an extension to be activated, based on an operation constraint and device information from a device information notifying part.

In the memory device controlling apparatus of the present invention, the extension selecting part obtains an extension and a parameter that satisfy a lower limit value of the operation constraint, and obtains an extension and a parameter that enhance performance so that the performance does not exceed an upper limit value of the operation constraint.

The memory device controlling apparatus of the present invention further includes a new protocol generating part that generates a new protocol with a redundant portion reduced, from the device information from a device information notifying part and the operation constraint from the operation constraint notifying part, and notifying the memory device of the new protocol to access the memory device with the new protocol.

In the memory device controlling apparatus of the present invention, the new protocol generating part generates a new command that sends/receives only information required for control of the host appliance from information sent/received in a standard command of the memory device.

In the memory device controlling apparatus of the present invention, the new protocol generating part generates a new command that sends/receives information of the same size as that of an access unit of data transfer with respect to the host appliance.

The memory device controlling apparatus of the present invention includes a buffer of a predetermined size in the adaptor, wherein the new protocol generating part converts transfer between the memory devices to transfer to regions that are physically continued.

In the memory device controlling apparatus of the present invention, the new protocol generating part accumulates data in a buffer in the adaptor, and thereafter, converts the data into an address space in the host appliance to transfer the converted data.

A memory device of the present invention is capable of being connected to a memory device controlling apparatus through an interface, and includes an extension control part that controls an extension of the memory device, and a device information notifying part that notifies the memory device controlling apparatus of device information with respect to a request from the memory device controlling apparatus, wherein the extension control part activates the extension with respect to a request of activating the extension from the memory device controlling apparatus.

The memory device of the present invention can take the following aspects based on the above configuration.

In the memory device of the present invention, the device information notifying part notifies the memory device controlling apparatus of a maximum operation frequency of an operation dock, and the memory device receives a request for an operation at a maximum operation frequency from the memory device controlling apparatus to respond to access using the extension from the memory device controlling apparatus.

In the memory device of the present invention, the device information notifying part notifies the memory device controlling apparatus of a maximum data bus width as device information, and the memory device receives a request for an operation at a maximum data bus width from the memory device controlling apparatus to respond to access using the extension from the memory device controlling apparatus.

In the memory device of the present invention, the device information notifying part notifies the memory device controlling apparatus of a striping configuration as device information, and the memory device receives a request for an operation at a maximum data bus width from the memory device controlling apparatus to respond to access using the extension from the memory device controlling apparatus.

The memory device of the present invention further includes a new protocol control part corresponding to a new protocol generated by the memory device controlling apparatus.

In the memory device controlling apparatus of the present invention, the device information requesting part receives a maximum operation frequency of an operation clock as device information from the memory device, and the extension activating part requests an operation at the maximum operation frequency.

Embodiment 1

FIG. 1 is a block diagram of a memory device and a memory device controlling apparatus according to Embodiment 1 of the present invention.

A host PC 101 is an information processing apparatus typified by a personal computer or the like. The host PC 101 has a central processing unit (CPU), a hard disk drive (HDD), and a random access memory (RAM).

An adaptor 102 can be connected to the host PC 101 and a memory device 103. The adaptor 102 has an extension activating part 121 and a device information requesting part 122. The extension activating part 121 requests an extension control part 131 of the memory device 103 to activate an extension, based on device information which the device information requesting part 122 has acquired from the memory device 103. In order to acquire device information on the functions and features in the memory device 103, an interface between the memory device 103 and the adaptor 102, and the like, the device information requesting part 122 requests a device information notifying part 132 to provide the device information.

The memory device 103 contains a non-volatile memory such as a flash memory. The memory device 103 only needs to contain at least a memory element capable of writing or reading data. The memory device 103 includes the extension control part 131 and the device information notifying part 132. The extension control part 131 activates the extension of the memory device 103 when being requested to activate as such by the extension activating part 121. The device information notifying part 132 manages the device information on the functions and features of the memory device 103 and an interface between the memory device 103 and the adaptor 102. The device information notifying part 132 sends the device information to the device information requesting part 121 when receiving a request for acquiring the device information from the device information requesting part 122.

Figure 2:
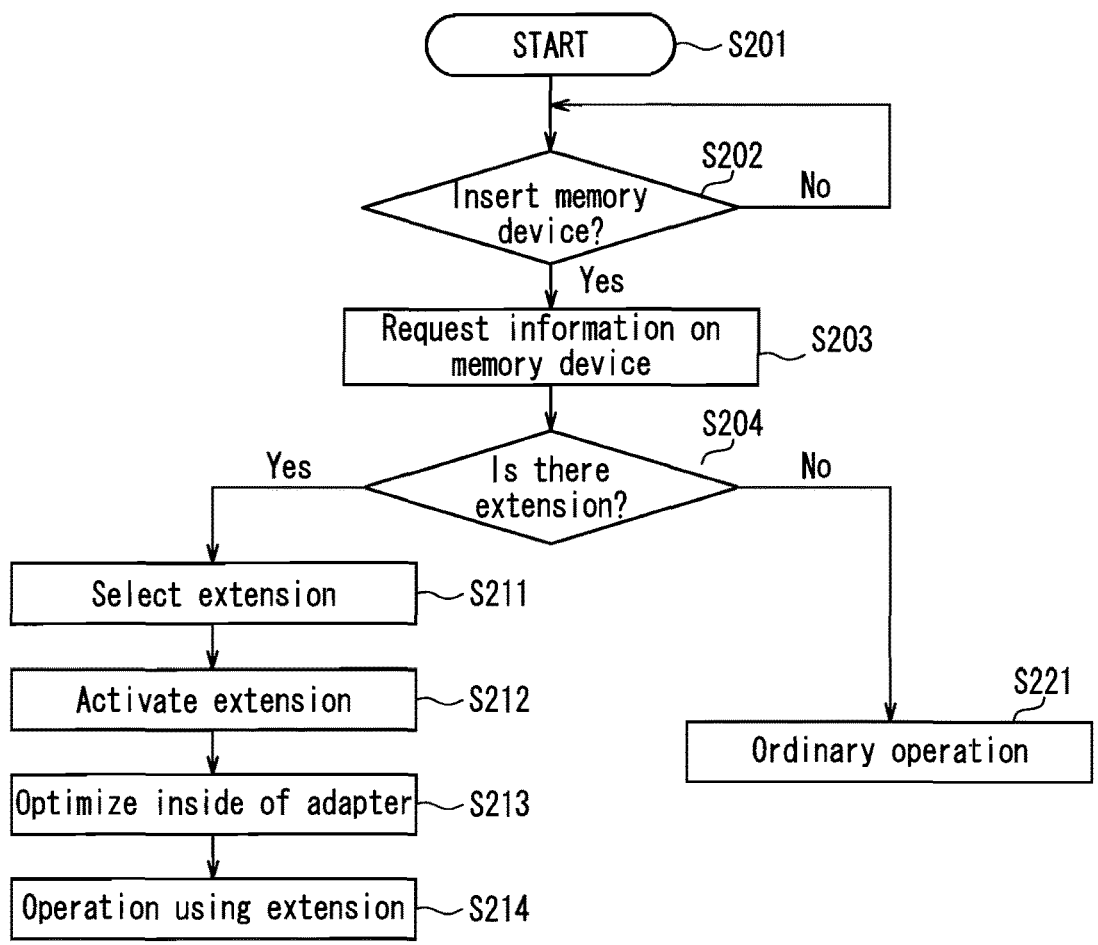
FIG. 2 is a flow diagram illustrating the operation of the memory device controlling apparatus according to Embodiment 1.

FIG. 2 is a flowchart showing the operation of the memory device controlling apparatus. Referring to FIG. 2, the case where the memory device 103 having an extension is connected to the adaptor 102, and the case where the memory device 103 having no extension is connected to the adaptor 102 will be described.

First, in S201, the adaptor 102 is turned on to be initialized. Then, the adaptor 102 is placed in a standby state until the memory device 103 is connected to the adaptor 102 (S202). When the memory device 103 is connected to the adaptor 102, the device information requesting part 122 acquires device information from the memory device 103 (S203). Then, the extension activating part 121 determines whether or not the device information acquired in the device information requesting part 122 contains information on the presence of an extension (S204). When the device information contains information on the presence of an extension, the extension activating part 121 selects the extension (211). On the other hand, when the device information does not contain the information on the presence of the extension, the extension activating part 121 executes an ordinary operation (211). In the ordinary operation (S221), the adaptor 102 is operated as a standard general-purpose interface of the host PC 101 without activating the extension.

When the extension is selected (S211), the extension activating part 121 sends a request for activating the extension to the extension control part 131 of the memory device 103 (S212). Then, the adaptor 102 activates the extension to be used (S213). Then, the adaptor 102 uses the extension to access the memory device 103 (S214).

Figure 3:
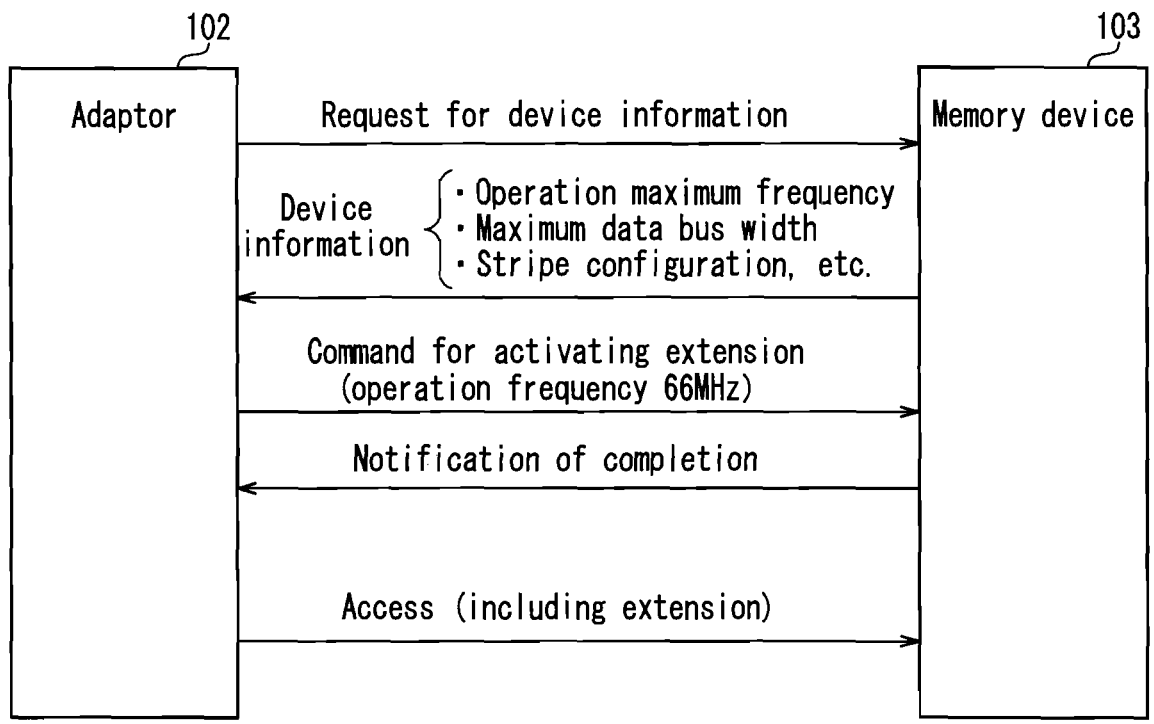
FIG. 3 is a schematic diagram showing a command and the flow of data between the memory device and the memory device controlling apparatus according to Embodiment 1.
Figure 4:
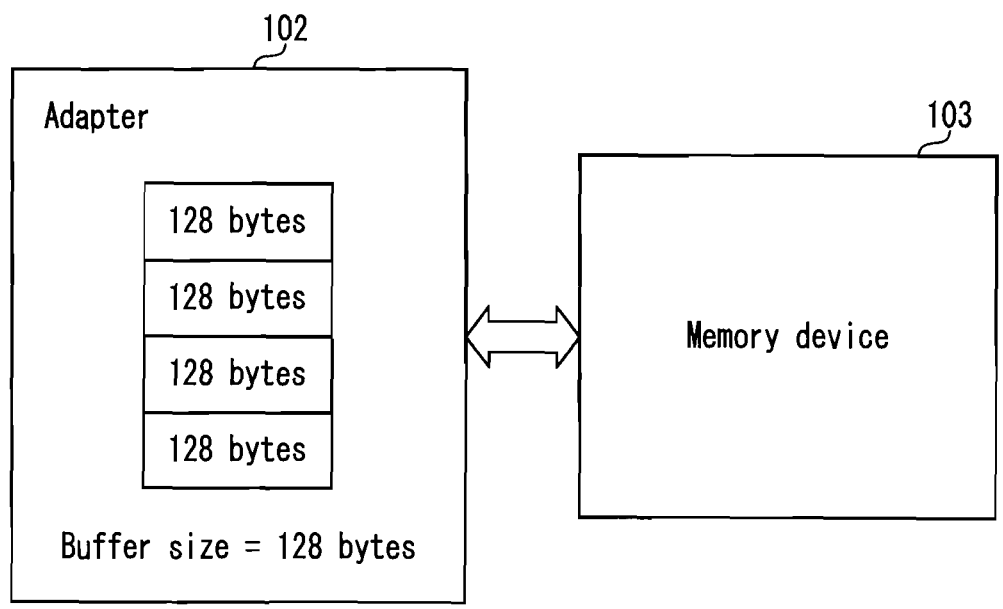
FIG. 4 is a schematic diagram illustrating buffer management of the memory device and the memory device controlling apparatus according to Embodiment 1.
Figure 5:
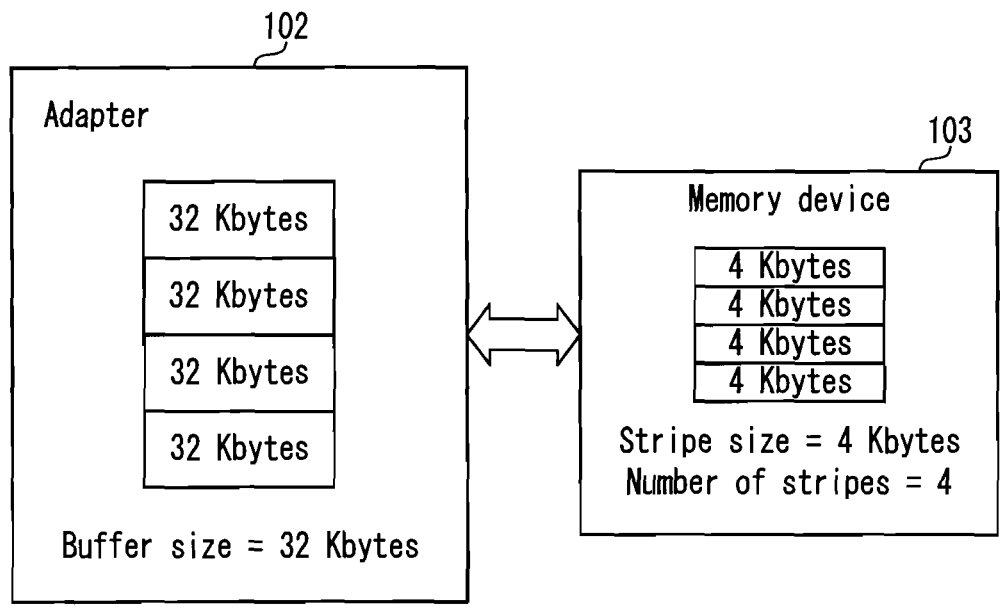
FIG. 5 is a schematic diagram illustrating buffer management of the memory device and the memory device controlling apparatus according to Embodiment 1.

Referring to FIGS. 3 to 5, the operation for activating the extension will be described more specifically.

FIG. 3 is a sequence diagram showing that a command and data are sent/received between the adaptor 102 and the memory device 103. As shown in FIG. 3, first, the adaptor 102 requests the device information with respect to the memory device 103. The memory device 103 sends the device information to the adaptor 102 when receiving a request for the device information from the adaptor 102. The device information contains a maximum operation frequency, a maximum data bus width, a stripe configuration, and the like. Next, the adaptor 102 sends a command for activating the extension to the memory device 103 based on the device information sent from the memory device 103. The memory device 103 activates the extension of its own when receiving the command for activating the extension from the adaptor 102. When completing the activation of the extension, the memory device 103 sends the notification of completion to the adaptor 102. When receiving the notification of completion from the memory device 103, the adaptor 102 starts accessing the memory device 103. This access includes, for example, the access for writing data on the memory device 103 and the access for reading data stored in the memory device 103. When the memory device 103 is not adaptable to the extension, or the extension in the memory device 103 is in a non-operated state, the adaptor 102 accesses the memory device 103 based on the functions excluding the extension.

As an example of the extension, the operation for changing a maximum frequency will be described. When receiving the notification of an operable maximum frequency from the memory device 103, the extension activating part 121 of the adaptor 102 selects the operable maximum frequency on the adaptor 102 side.

Specifically, the memory device 103 whose external interface abides by a CardBus specification is connected directly to the host PC 101 by a method defined by the CardBus specification. That is, the operation frequency is set to be 33 MHz that is the maximum operation frequency under the CardBUS specification. In the case where the host PC 101 is adaptable to only the operation frequency of 33 MHz abiding by the CardBus specification even when the memory device 103 has an extension operable at 66 MHz, the host PC 101 and the memory device 103 become accessible based on the operation frequency of 33 MHz. The "PCMCIA" is an abbreviation of "Personal Computer Memory Card International Association". The "Cardbus specification" is a 32-bit interface specification worked out by the PCMCIA On the other hand, when the memory device 103 is connected to the adaptor 102 adaptable to the extension, the memory device 103 has the extension set to be "active" by the control from the adaptor 102 and can be operated at an operation frequency of 66 MHz. More specifically, data can be transferred at a transfer speed about twice the data transfer abiding by the CardBus specification.

Referring to FIGS. 4 and 5, the operation will be described in the case where the memory device 103 contains a plurality of physical memories, whereby data striping is performed. First, the adaptor 102 acquires stripe information as the device information from the memory device 103. The adaptor 102 uses the stripe information acquired from the memory device 103 to change a control method of its own.

FIG. 4 shows a buffer configuration in a default state not using the stripe information. The adaptor 102 shown in FIG. 4 includes 4 buffer memories with a size of 128 bytes. That is, the adaptor 102 manages the access from the host PC 102 in a basic unit of 128 bytes. The adaptor 102 accesses the memory device 103 based on the basic unit.

Herein, when the adaptor 102 refers to the stripe information and recognizes that the buffer configuration of the memory device 103 is a buffer configuration (4 Kbytes×4 memories) shown in FIG. 5, the adaptor 102 manages the buffer in 32 Kbytes (8 Kbytes×4). The adaptor 102 matches the basic access unit to the memory device 103 with the buffer configuration of the memory device 103, thereby being capable of making an optimum access to the memory device 103 in accordance with the characteristics of the memory device 103. The "stripe information" contains information on a stripe size and the number of stripes.

Specifically, the memory device 103 using a flash memory that is mainstream as a recent non-volatile memory device contains a plurality of flash memories and allows the plurality of flash memories to be operated in parallel. Such a plurality of flash memories are managed collectively, using a management table or the like, whereby the overhead of processing is reduced to increase a data transfer speed. Thus, the adaptor 102 accesses the memory device 103 with a striping unit in mind, thereby being capable of accessing the memory device 103 at a high speed. In the above configuration, although the speed of access can be increased by changing a data size, the speed of access also can be increased even by changing a maximum data bus width.

According to the present embodiment, the adaptor 102 acquires the stripe information in the memory device 103 and manages a buffer in accordance with the acquired stripe information, thereby being capable of making an optimum access to the memory device 103 in accordance with the characteristics of the memory device 103. This can increase the access between the adaptor 102 and the memory device 103.

The host PC 101 in the present embodiment is an exemplary host appliance of present invention. The adaptor 102 in the present embodiment is an exemplary memory device controlling apparatus of the present invention. The memory device 103 in the present embodiment is an exemplary memory device of the present invention. The extension activating part 121 in the present embodiment is an exemplary extension activating part of the present invention. The device information requesting part 122 in the present embodiment is an exemplary device information requesting part of the present invention. The extension control part 131 in the present embodiment is an exemplary extension control part of the present invention. The device information notifying part 132 in the present embodiment is an exemplary device information notifying part of the present invention.

Embodiment 2

Figure 6:
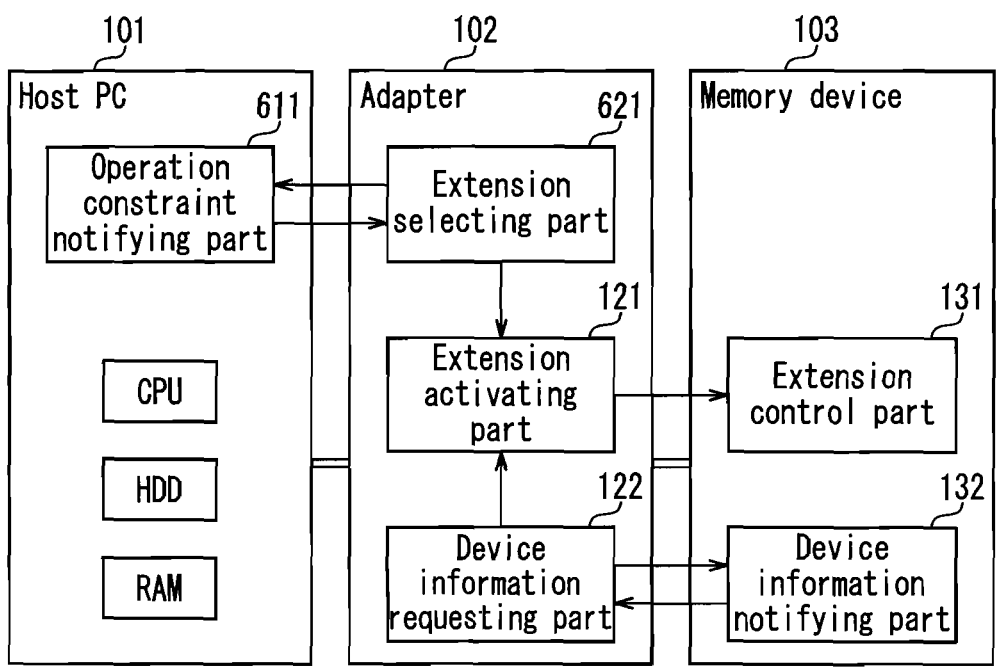
FIG. 6 is a block diagram of a memory device and a memory device controlling apparatus according to Embodiment 2.

FIG. 6 is a block diagram of a memory device and a memory device controlling apparatus in Embodiment 2 of the present invention.

A host PC 101 is an information processing apparatus typified by a personal computer or the like. The host PC 101 has a CPU, an HDD, and a RAM. The host PC 101 has an operation constraint notifying part 611.

The adaptor 102 can connect the host PC 101 and a memory device 103 to each other. The adaptor 102 has an extension activating part 121 and a device information requesting part 122. The extension activating part 121 requests an extension control part 131 to activate an extension based on device information that the device information requesting part 122 has acquired from the memory device 103. In order to acquire device information on the functions and features in the memory device 103, an interface with the adaptor 102, and the like, the device information requesting part 122 requests the device information notifying part 132 to acquire the device information. The adaptor 102 further has an extension selecting part 621.

The memory device 103 contains a non-volatile memory such as a flash memory. The memory device 103 only needs to contain at least a memory element capable of writing or reading data. The memory device 103 includes the extension control part 131 and the device information notifying part 132. When being requested to activate an extension of the memory device 103 by the extension activating part 121, the extension control part 131 activates the extension. The device information notifying part 132 manages the device information such as the functions and features of the memory device 103, an interface between the memory device 103 and the adaptor 102, and the like. When being requested to acquire the device information by the device information requesting part 122, the device information notifying part 132 sends the device information to the device information requiring part 122.

The operation constraint notifying part 611 notifies the adaptor 102 of the operation constraint in the use of the memory device 103. The operation constraint contains information on an upper limit value of power and information on a transfer speed of data. The upper limit value of power refers to an upper limit value of power at a time when the host PC 101 executes an application program. The transfer speed refers to the speed of data transfer at which a video (moving picture) can be displayed smoothly.

The extension selecting part 621 selects an extension so as to satisfy the operation constraint notified by the operation constraint notifying part 611.

Figure 7A:
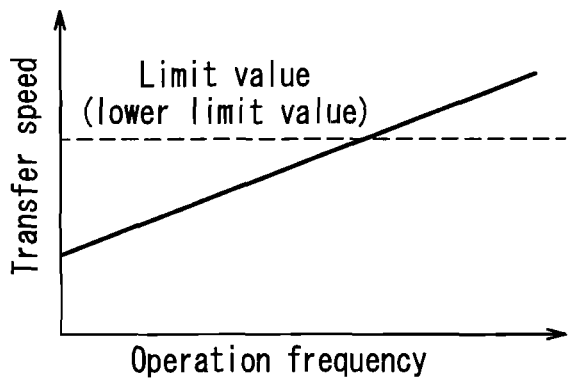
FIG. 7A is a characteristic diagram showing a limit value of the memory device and the memory device controlling apparatus according to Embodiment 2.
Figure 7B:
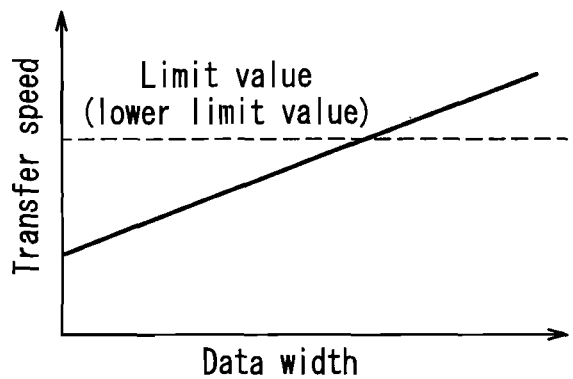
FIG. 7B is a characteristics diagram showing a limit value of the memory device and the memory device controlling apparatus according to Embodiment 2.
Figure 7C:
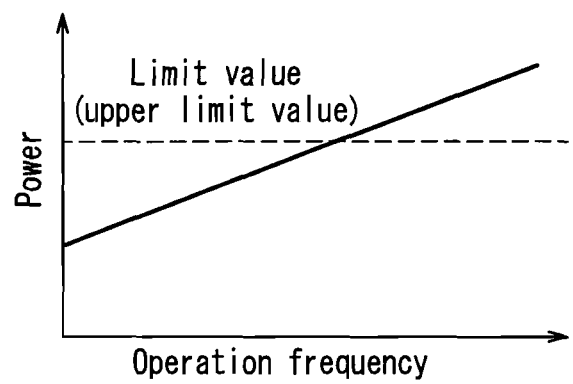
FIG. 7C is a characteristics diagram showing a limit value of the memory device and the memory device controlling apparatus according to Embodiment 2.
Figure 7D:
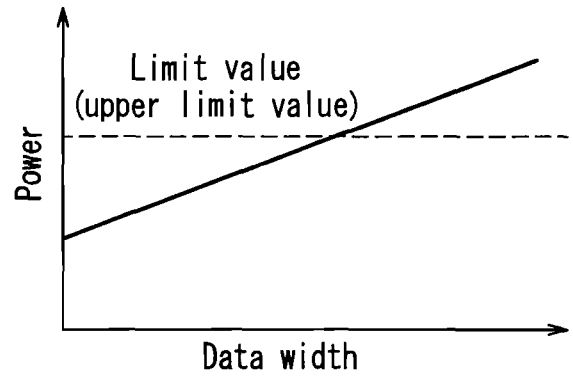
FIG. 7D is a characteristics diagram showing a limit value of the memory device and the memory device controlling apparatus according to Embodiment 2.

FIG. 7A is a graph showing a relationship between an operation frequency and a data transfer speed. FIG. 7B is a graph showing a relationship between a data width and a data transfer speed. FIG. 7C is a graph showing a relationship between an operation frequency and the power of the host PC. FIG. 7D is a graph showing a relationship between a data width and the power of the host PC. Hereinafter, the operation will be described in which the extension selecting part 621 selects an extension and parameters thereof so as to satisfy the operation constraint requested by the host PC 101.

First, the device information notifying part 132 holds device information. The device information held by the device information noting part 132 is the relationship between parameters that can be set as the memory device 103 and values changing along with the change in the parameters, as shown in FIGS. 7A to 7D. The device information held by the device information notifying part 132 includes, for example, a transfer speed in the case of changing an operation frequency (see FIG. 7A), a transfer speed in the case of changing a data width (see FIG. 7D), power in the case of changing an operation frequency (see FIG. 7C), and power in the case of changing a data width (see FIG. 7D). These pieces of device information can be represented by numerical expressions or values at discontinuous sample points. Broken lines shown in FIGS. 7A to 7D represent limit values of the operation constraint in the host PC 101.

The extension selecting part 621 can select an extension based on the relationships between characteristic values (solid lines in the figures) shown in FIGS. 7A to 7D and limit values (broken lines). More specifically, the extension selecting part 621 selects an optimum extension and parameters thereof based on the characteristics of the memory device 103 represented by the solid lines in FIGS. 7A to 7D and the limit values of the operation constraint of the host PC 101 represented by the broken lines. A method for selecting the optimum extension and parameters thereof will be described with reference to FIG. 8.

Figure 8:
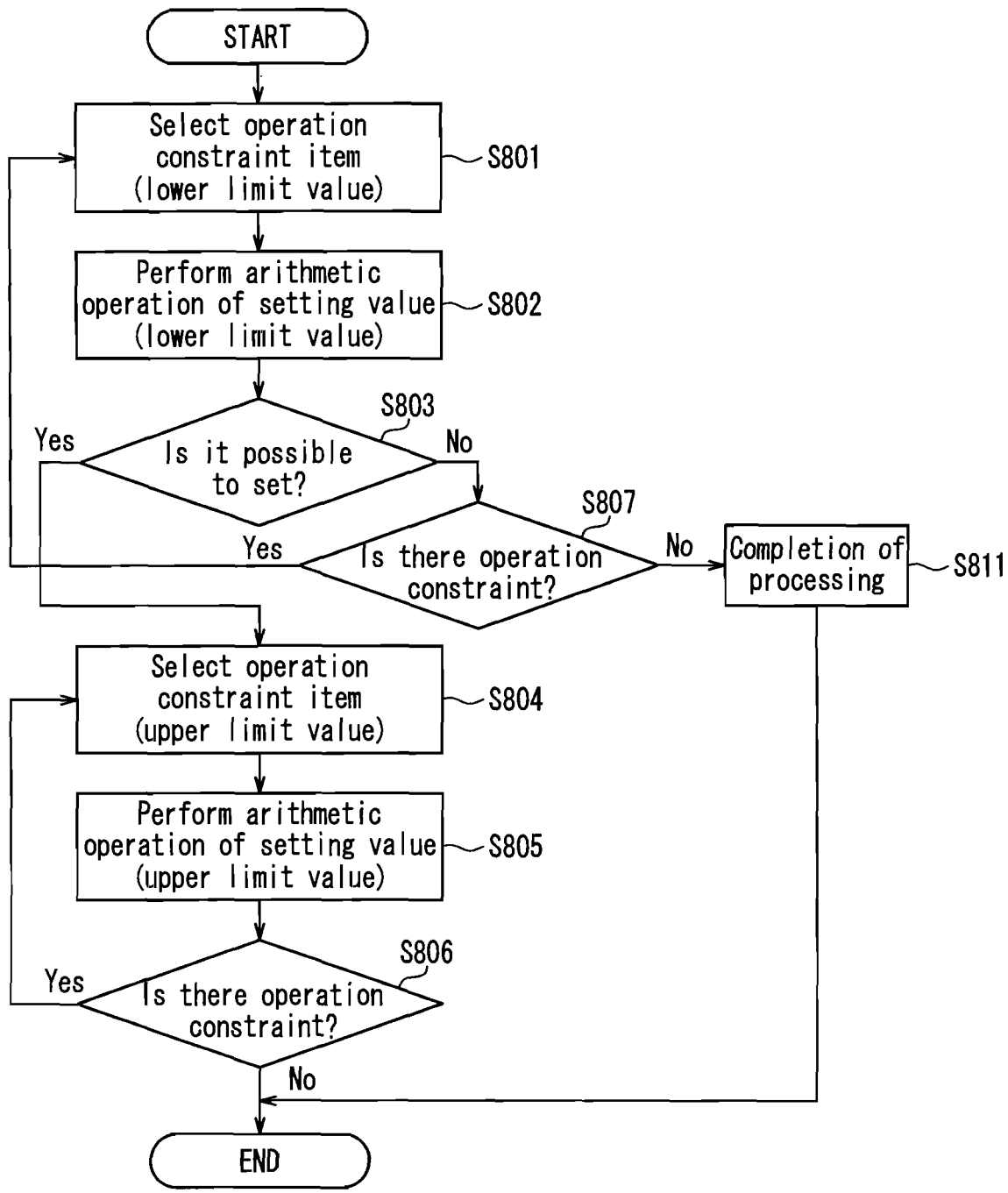
FIG. 8 is a flow diagram showing the operation of the memory device and the memory device controlling apparatus according to Embodiment 2.

FIG. 8 shows a flow in which the extension selecting part 621 selects an optimum extension and parameters thereof. When the extension selecting part 621 enters a selection flow, the extension selecting part 621 selects an operation constraint of a lower value (S801), and performs an arithmetic operation to obtain a setting value that satisfies the request from the host PC 101 (S802). A constraint item can be selected depending upon the request from the host PC 101. The constraint item can be selected in a predetermined order or an irregular order by the adaptor 102 if there is no request from the host PC 101. The extension selecting part 621 repeats S801 and S802 until obtaining a value that can be set (S803, S807). As the setting value, a minimum setting value is selected, which exceeds the limit value and can be set.

Herein, when the parameters have an effect on the limit values (upper limit values), it is ensured that none of the parameters exceeds the limit values (upper limit value). When even one parameter exceeds the limit values (upper limit values), the parameter is dealt with as a "value that cannot be set" (NO in S803). When the arithmetic operation result is a "value that can be set" (YES in S803), the process proceeds to the step of selecting operation constraint items (upper limit values) (S804). On the other hand, when it is not possible to obtain a value that can be set in all the operation constraint items, a completion process is performed (S811).

The operation (S805) of selecting operation constraint items (upper limit values) when the value that can be set is obtained will be described. The setting value of the lower limit value guarantees the lowest possible operation performance requested by the host PC 101. The process of setting an upper limit value is the process of setting a setting value for operating the adaptor 102 and the memory device 103 with operable maximum performance. In S805, the constraint items that can be set are selected in the same way as in S801, and setting values not exceeding the limit values are obtained by an arithmetic operation. The extension selecting part 621 repeats S804 and S805 until the last operation constraint item. The extension selecting part 621 obtains setting values by an arithmetic operation in all the constraint items (S806).

According to the present embodiment, the operation constraint notifying part 611 of the host PC 101 notifies the adaptor 102 of the operation constraint, the device information notifying part 132 of the memory device 103 notifies the adaptor 102 of device information, and the extension activating part 121 of the adaptor 102 activates the extension of the memory device 103 to satisfy the constraint of the host PC 101, whereby data can be transferred at a high speed exceeding the standard transfer speed of the memory device 103.

In the present embodiment, although the operation frequency, data width, transfer speed, and power are listed as setting items, the other items can be processed equally.

The host PC 101 in the present embodiment is an exemplary host appliance of the present invention. The adaptor 102 in the present embodiment is an exemplary memory device controlling apparatus of the present invention. The memory device 103 in the present embodiment is an exemplary memory device of the present invention. The extension activating part 121 in the present embodiment is an exemplary extension activating part of the present invention. The device information requesting part 122 in the present embodiment is an exemplary device information requesting part of the present invention. The extension control part 131 in the present embodiment is an exemplary extension control part of the present invention. The device information noting part 132 in the present embodiment is an exemplary device information notifying part of the present invention. The operation constraint notifying part 611 in the present embodiment 611 is an exemplary operation constraint notifying part of the present invention. The extension selecting part 621 in the present embodiment is an exemplary extension selecting part of the present invention.

Embodiment 3

Figure 9:
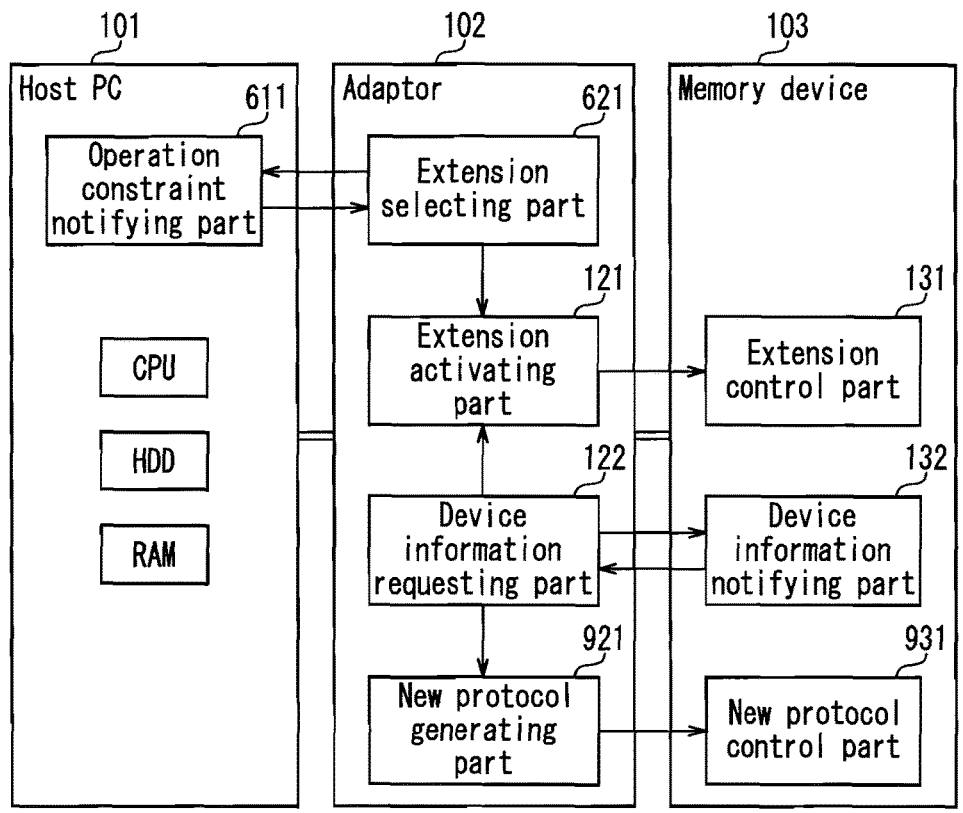
FIG. 9 is a block diagram of a memory device and a memory device controlling apparatus according to Embodiment 3.

FIG. 9 is a block diagram of a memory device and a memory device controlling apparatus in Embodiment 3 of the present invention.

A host PC 101 is an information processing apparatus typified by a personal computer or the like. The host PC 101 has a CPU, an HDD, and a RAM. The host PC 101 has an operation constraint notifying part 611.

An adaptor 102 can be connected to the host PC 101 and a memory device 103. The adaptor 102 has an extension activating part 121 and a device information requesting part 122. The extension activating part 121 requests an extension control part 131 of the memory device 103 to activate an extension, based on the device information which the device information requesting part 122 has acquired from the memory device 103. In order to acquire device information on the functions and features in the memory device 103, an interface between the memory device 103 and the adaptor 102, and the like, the device information requesting part 122 requests a device information notifying part 132 to acquire the device information. The adaptor 102 further has an extension selecting part 621 and a new protocol generating part 921.

The memory device 103 contains a non-volatile memory such as a flash memory. The memory device 103 only needs to contain at least a memory element capable of writing or reading data. The memory device 103 includes the extension control part 131 and the device information notifying part 132. The extension control part 131 activates the extension of the memory device 103 when being requested to activate as such by the extension activating part 121. The device information notifying part 132 manages the device information on the functions and features of the memory device 103, an interface between the memory device 103 and the adaptor 102, and the like. The device information notifying part 132 sends the device information to the device information requesting part 122 when receiving a request for acquiring the device information from the device information requesting part 122. The memory device 103 further has a new protocol control part 931.

The operation constraint noting part 611 notifies the adaptor 102 of the operation constraint in the use of the memory device 103. The operation constraint contains information on an upper limit value of power and information on a transfer speed of data. The upper limit value of power refers to an upper limit value of power at a time when the host PC 101 executes an application program. The transfer speed refers to the speed of data transfer at which a video (moving picture) can be displayed smoothly.

The extension selecting part 621 selects an extension so as to satisfy the operation constraint notified by the operation constraint notifying part 611.

As shown in FIG. 9, the memory device and the memory device controlling apparatus of the present embodiment define a new command between the new protocol generating part 921 of the adaptor 102 and the new protocol control part 931 of the memory device 103. The memory device and the memory device controlling apparatus of the present embodiment define a new command, thereby minimizing the overhead of command processing.

Figure 10:
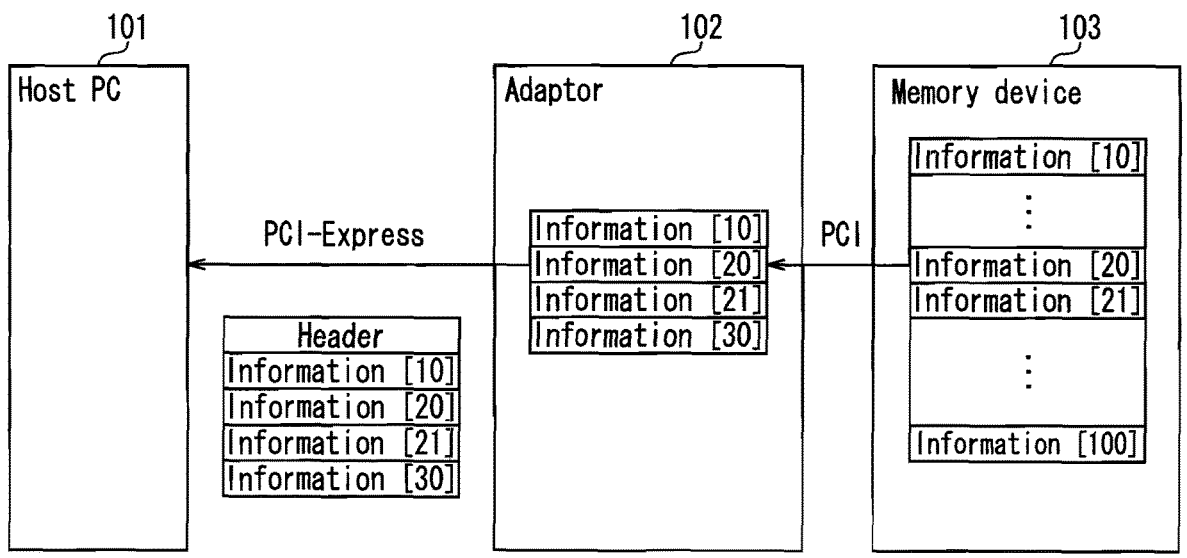
FIG. 10 is a schematic diagram illustrating the flow of processing data in the memory device and the memory device controlling apparatus according to Embodiment 3.

FIG. 10 is a schematic diagram showing a sequence of generating a new protocol. In the adaptor 102, the sequence before the generation of a new protocol does not specify information required in the host PC 101. Specifically, the adaptor 102 takes out 100 pieces of information [1]-[100] from the memory device 103 in a standardized manner and notifies the host PC 101 of the information. That is, the adaptor 102 acquires the information [1]-[100] from the memory device 103 even if the information required in the host PC 101 is [10], [20], [21], and [30], which results in unnecessary information being transferred from the memory device 103 to the adaptor 102. If the information to be acquired from the memory device 103 changes dynamically, and it is necessary to issue a command in writing and reading data, the overhead of a data transfer time occurs, which prolongs a transfer time. In the present embodiment, the new protocol generating part 921 and the new protocol control part 931 define a command, which contains information required for setting a new protocol between the adapter 102 and the memory device 103. With such a configuration, the transmission/reception of unnecessary information can be reduced, which can shorten the transfer time of data and enhance the transfer performance.

Furthermore, when the communication protocol between the host PC 101 and the adaptor 102 is a protocol that performs communication in a packet as in an PCI-Express specification, the size of the command between the adaptor 102 and the memory device 103 can be selected so as to be suitable for packeting. With such a configuration, the data transfer between the host PC 101 and the adaptor 102 can be performed more efficiently.

In the present embodiment, by defining a new command between the new protocol generating part 921 and the new protocol control part 931, the overhead of the command processing can be minimized. This can reduce the transmission/reception of unrequired information and enhance transfer performance.

More specifically, a redundant portion of transfer on the host PC 101 side and the memory device 103 side is deleted by the new protocol generating part 921 of the adaptor 102, whereby the efficiency of the transfer can be enhanced.

The host PC 101 in the present embodiment is an exemplary host appliance of present invention. The adaptor 102 in the present embodiment is an exemplary memory device controlling apparatus of the present invention. The memory device 103 in the present embodiment is an exemplary memory device of the present invention. The extension activating part 121 in the present embodiment is an exemplary extension activating part of the present invention. The device information requesting part 122 in the present embodiment is an exemplary device information requesting part of the present invention. The extension control part 131 in the present embodiment is an exemplary extension control part of the present invention. The device information notifying part 132 in the present embodiment is an exemplary device information notifying part of the present invention. The operation constraint notifying part 611 in the present embodiment is an exemplary operation constraint notifying part of the present invention. The extension selecting part 621 in the present embodiment is an exemplary extension selecting part of the present invention. The new protocol generating part 921 in the present embodiment is an exemplary new protocol generating part of the present invention. The new protocol control part 931 in the present embodiment is an exemplary new protocol control part of the present invention.

Embodiment 4

Figure 11:
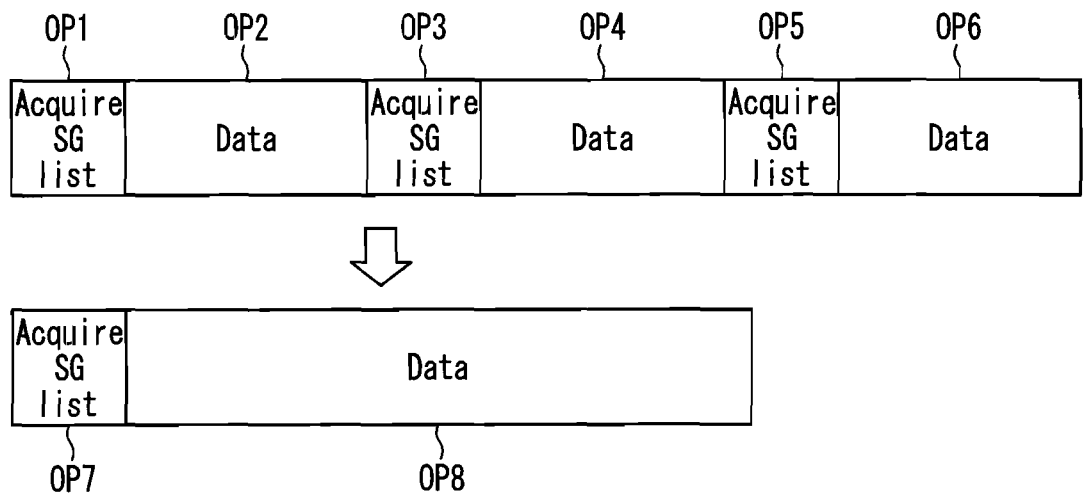
FIG. 11 is a schematic diagram showing a data table that can be transferred between a memory device and a memory device controlling apparatus according to Embodiment 4.

FIG. 11 is a schematic diagram showing a data table that can be transferred between the memory device and the memory device controlling apparatus. The data shown in FIG. 11 corresponds to the one transferred between the memory device and the memory device controlling apparatus shown in FIG. 9.

A memory management system of the host PC 101 in recent years adopts the management on a page basis in most cases in order to use a limited physical memory space effectively. The pages mostly are placed discretely in a memory region of the memory device 103. Thus, when the memory device 103 is connected directly to the host PC 101 to transfer data, the host PC 101 acquires a list (SG list), describing which page the data to be transferred from the memory device 103 to the host PC 101 corresponds to, from the memory device 103. The host PC 101 transfers the data from the memory device 103 in accordance with the SG list.

In order to transfer data in the above manner, as shown in OP1 to OP6 of FIG. 11, the process of acquiring an SG list (for example, OP3) is required so as to know a subsequent page at a time when the transfer of each page (for example, OP2) is completed. In OP1 to OP6 of FIG. 11, the overhead during data transfer is enlarged, which makes it impossible to transfer data from the memory device 103 to the host PC 101 efficiently.

In the present embodiment, as shown in OP7 and OP8 of FIG. 11, a continuous region of a page is kept in the adaptor 102 and transferred. This makes it unnecessary to acquire the SG list during data transfer. As a result, the overhead of acquiring the SG list can be reduced, and data can be transferred from the memory device 103 to the host PC 101 efficiently.

Embodiment 5

Figure 12:
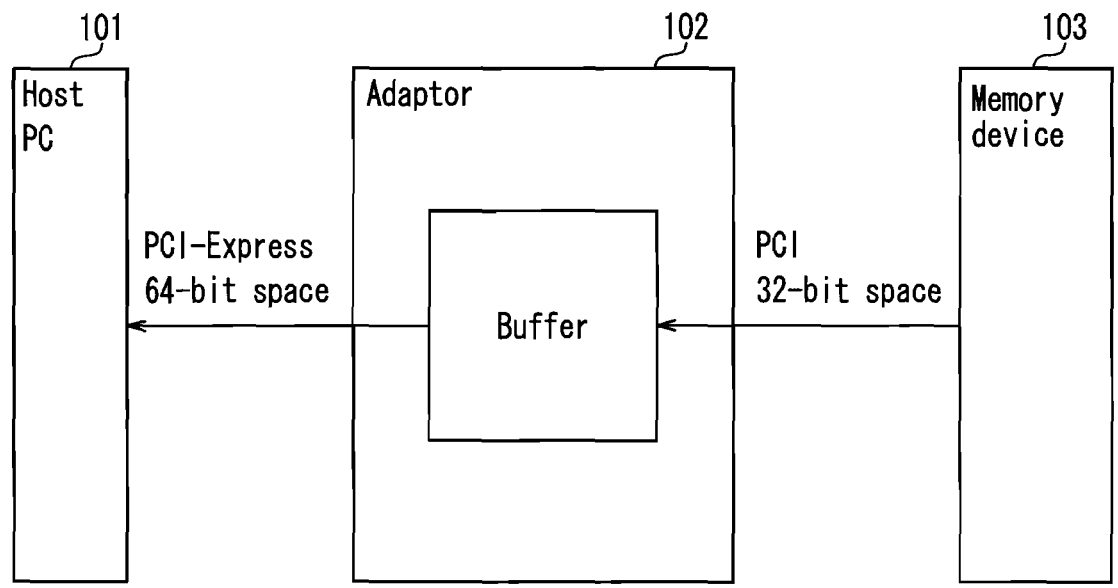
FIG. 12 is a schematic diagram illustrating the protocol conversion in a memory device and a memory device controlling apparatus according to Embodiment 5.

FIG. 12 is a block diagram showing the concept of data transfer between the host PC 101, the adaptor 102, and the memory device 103. The data transfer shown in FIG. 12 can be performed by the memory device and the memory device controlling apparatus shown in FIG. 9.

In recent years, in a host PC, an attempt is made to increase a CPU from a 32-bit space to a 64-bit space due to the increase in a main memory region. As shown in FIG. 12, when the memory device 103 adaptable to only the 32-bit space is connected to the host PC 101 adaptable to the 64-bit space, and data is transferred from the memory device 103 to the host PC 101, the host PC 101 transfers data to the 32-bit space of its own, and thereafter, replicates the data. Thus, useless processing occurs in the host PC 101.

In the present embodiment, the useless processing as described above can be eliminated. First, data is transferred from the memory device 103 to the adaptor 102. Specifically, when receiving a transfer request from the host PC 101, the adaptor 102 issues a transfer request to the memory device 103. The transfer request issued by the adaptor 102 is the one for transferring data with respect to a buffer (placed in the 32-bit space) inside the adaptor 102. The adaptor 102 transfers the data, which is transferred to the buffer of its own from the memory device 103, to an address (adaptable to the 64-bit space) requested by the host PC 101.

The adaptor 102 converts a protocol of the memory device 103 adaptable to only the 32-bit space to a protocol capable of transferring the data to the 64-bit space. Thus, when the host PC 101 requests the adaptor 102 to be adaptable to the 64-bit space, the adaptor 102 can transfer the data read from the memory device 103 adaptable to only the 32-bit space to the 64-bit-space in the host PC 101. This can make it unnecessary to perform useless processing in the host PC 101 and enables the processing to be performed efficiently.

Embodiment 6

Figure 13:
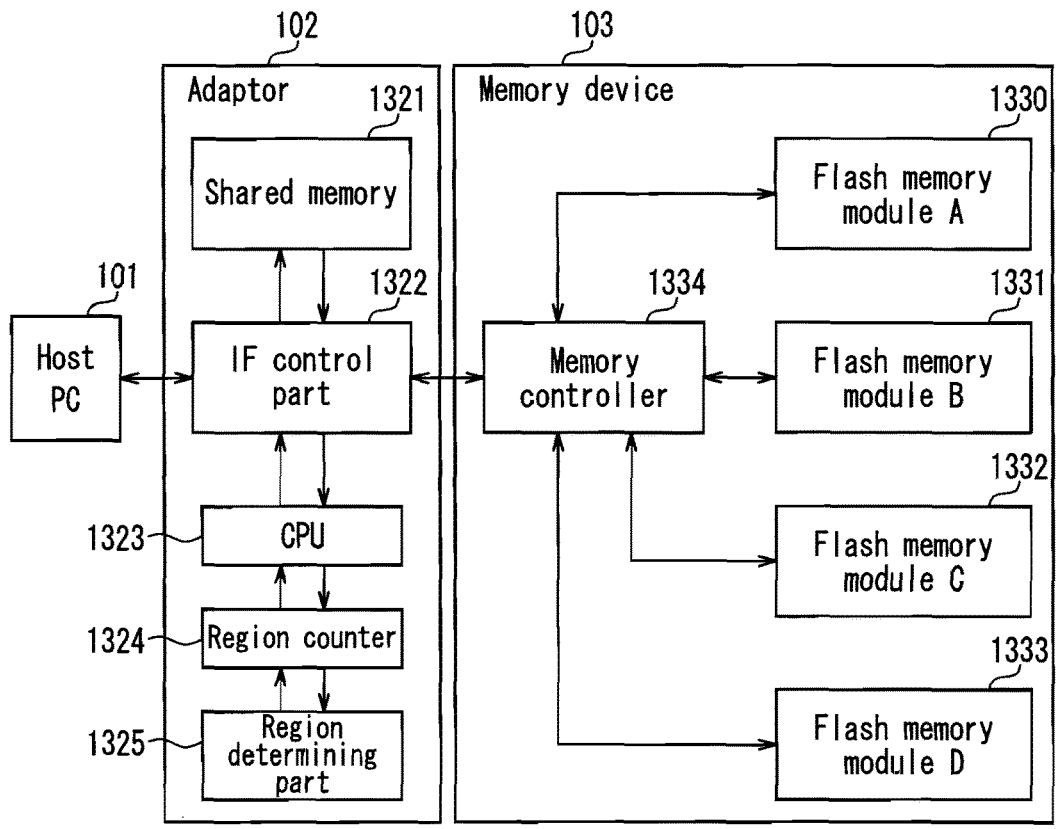
FIG. 13 is a block diagram of a memory device and a memory device controlling apparatus according to Embodiment 6.

FIG. 13 is a block diagram of a memory device and a memory device controlling apparatus in Embodiment 6 of the present invention.

A host PC 101 is an information processing apparatus typified by a personal computer or the like. The host PC 101 has a CPU, an HDD, and a RAM. An adaptor 102 can be connected to the host PC 101 and a memory device 103. The memory device 103 contains a non-volatile memory such as a flash memory. The memory device 103 only needs to contain at least a memory element capable of writing or reading data.

The memory device 103 includes a flash memory module A (1330), a flash memory module B (1331), a flash memory module C (1332), and a flash memory module D (1333) that are the management unit of a flash memory and a basic unit of striping. The memory device 103 has a memory controller 1334 that controls the writing and reading of data with respect to the flash memory modules 1330 to 1333.

The adaptor 102 includes a shared memory 1321, an interface control part 1322, a CPU 1323, a region counter 1324, and a region determining part 1325. The shared memory 1321 can transmit/receive data between the memory device 103 and the host PC 101. The interface control part 1322 can control the connection between the interface on the host PC 101 side and the interface on the memory device 103 side. The CPU 1323 can control the entire sequence of the adaptor 102. The region counter 1324 can mange a region where the data transfer has been completed in the flash memory modules 1330 to 1333. The region determining part 1325 determines a region where the data transfer has been completed among memory regions included in the flash memory modules 1330 to 1333.

Figure 14:
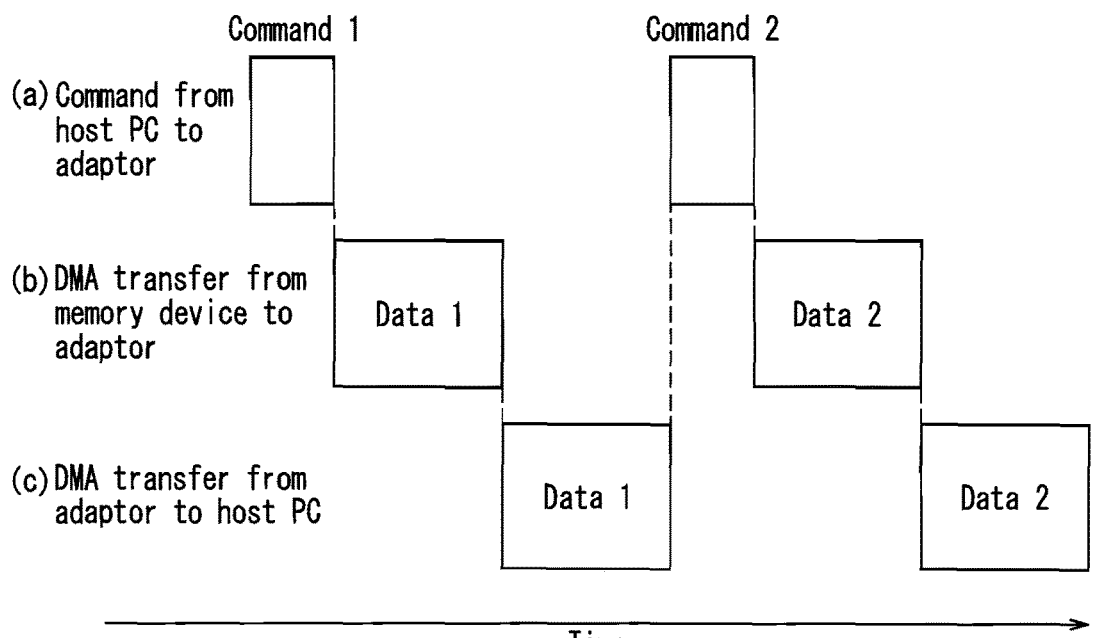
FIG. 14 is a schematic diagram illustrating the data transfer in the memory device and the memory device controlling apparatus according to Embodiment 6.

FIG. 14 is a timing chart showing commands and the flow of data transfer between the host PC 101, the adaptor 102, and the memory device 103. Referring to FIG. 14, the processing will be described in the case of performing transfer via a general-purpose PC interface such as a PCI bus and a PCI-Express bus (transfer from the memory device 103 to the host PC 101). As the data transfer system, a direct memory access (DMA) transfer system is used.

In FIG. 14, (a) shows a command from the host PC 101 to the adaptor 102, (b) shows the processing of DMA transfer from the memory device 103 to the adaptor 102, and (c) shows the processing of DMA transfer from the adaptor 102 to the host PC 01.

First, when the adaptor 102 receives a command 1 from the host PC 101, data 1 is transferred from the memory device 103. The order of the transfer is not limited according to the PCI specification and the PCI-Express specification. The order of data transfer depends upon the processing in the memory device 103, so that the adaptor 102 starts the DMA transfer (data 1) to the host PC 101 after the completion of the transfer of the data 1 from the memory device 103. Thus, the host PC 101 does not issue a subsequent command (command 2) unless the DMA transfer from the adaptor 102 is completed. Therefore, the latency time up to the arrival of the data to the host PC 101 from the memory module 103 corresponds to a time obtained by adding the DMA transfer time from the adaptor 102 to the host PC 101 to the DMA transfer time from the memory device 103 to the adaptor 102. Thus, when video data (moving picture) stored in the memory module 103 is replayed, a period from a time when a user inputs a replay command to the host PC 101 to a time when a video is displayed on a display apparatus is prolonged.

Figure 15:
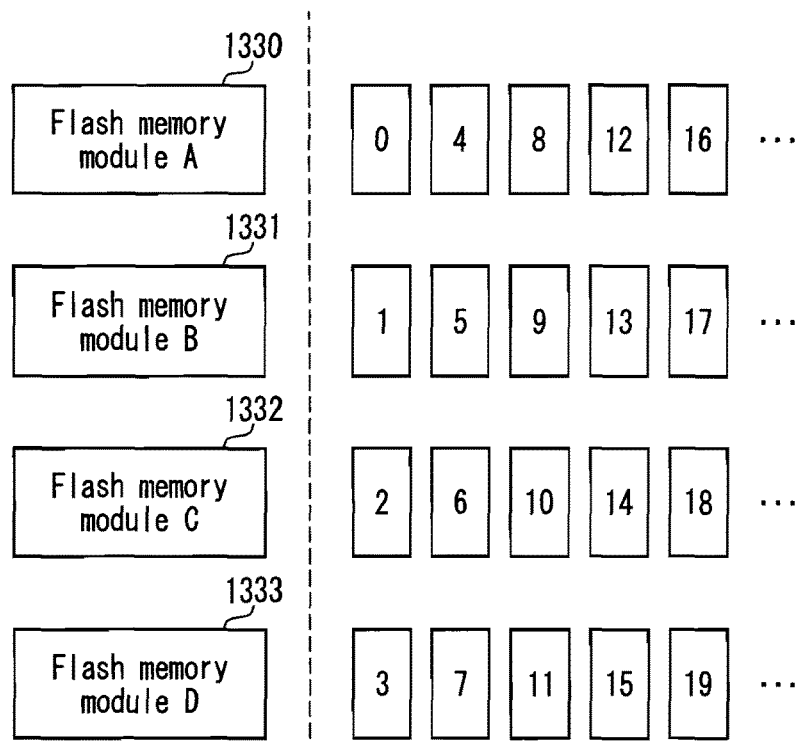
FIG. 15 is a schematic diagram illustrating the data transfer in the memory device and the memory device controlling apparatus according to Embodiment 6.

Referring to FIG. 15, the address order of the data in the memory device 103 when viewed from the host PC 101 will be described. When striping is performed in the following order: the flash memory module A (1330), the flash memory module B (1331), the flash memory module C (1332), and the flash memory module D (1333), the address order is repeatedly set in the following order: the flash memory module A (1330), the flash memory module B (1331), the flash memory module C (1332), and the flash memory module D (1333). The address order of the flash memory module A (1330) is an address 0, an address 4, an address 8, and an address 12.

Since the flash memory modules 1330 to 1333 respectively are operated in parallel independently, the order of data among the respective flash memory modules 1330 to 1333 transferred from the memory device 103 is not determined. However, the order of data in the respective flash memory modules 1330 to 1333 can be determined. That is, in the flash memory module A (1330), the data can be output in the following order: address 0, address 4, address 8, and address 12. Thus, by defining the output order in the memory device 103, the data output from the memory device 103 can be specified before the completion of the transfer of all the data from the memory device 103.

Specifically, the region determining part 1325 determines the data transferred on the basis of the respective flash memory modules 1330 to 1333, and sends the determination result to the region counter 1324. The region counter 1324 manages the data on the striping basis that has been transferred (hereinafter, referred to as stripe data). An example of the management data will be described with reference to FIG. 16.

Figure 16:
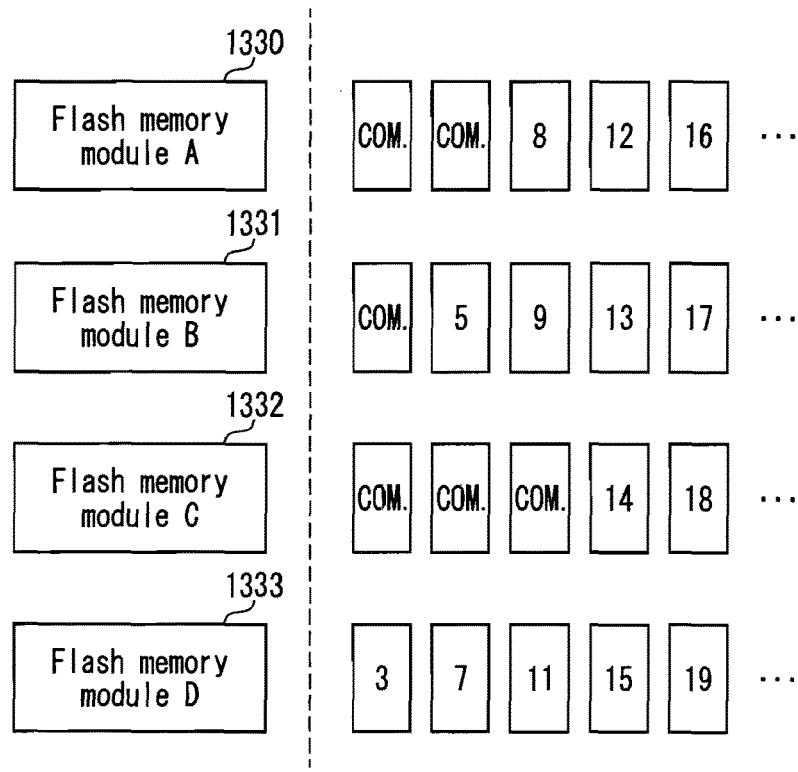
FIG. 16 is a schematic diagram illustrating the data transfer in the memory device and the memory device controlling apparatus according to Embodiment 6.

FIG. 16 shows that, in the flash memory module A (1330), the transfer of the addresses 0 and 4 has been completed, and the completion of the transfer is managed by setting up flags representing the "completion of transfer". The region determining part 1325 can determine that the transfer has been completed, for example, based on whether or not the last data of the stripe data in the respective flash memory modules 1330 to 1333 has been transferred. Furthermore, the information with the stripe configuration of the memory device 103 can be acquired by the method according to Embodiment 1.

According to the present embodiment, the data transfer from the memory device 103 to the adaptor 102 is managed on the striping basis in the flash memory modules 1330 to 1333, so that the latency time up to the acquirement of the data by the host PC 101 can be shortened.

Figure 17:
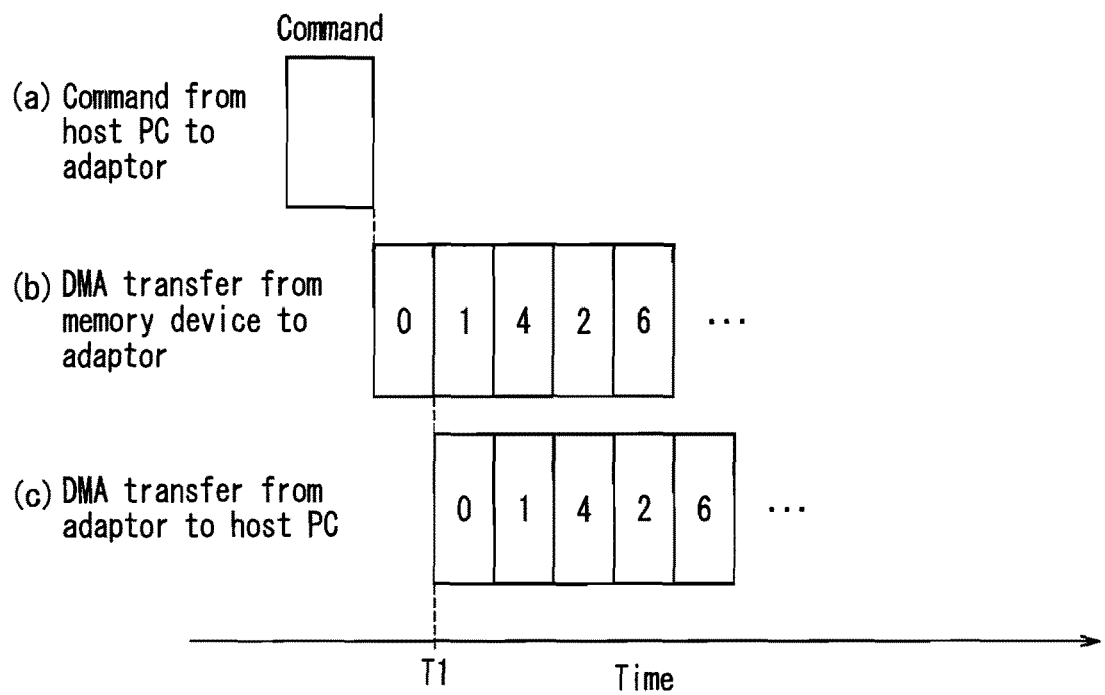
FIG. 17 is a schematic diagram illustrating the data transfer in the memory device and the memory device controlling apparatus according to Embodiment 6.

FIG. 17 is a timing chart showing a command and the flow of data transfer between the host PC 101, the adaptor 102, and the memory device 103 according to the present embodiment. As shown in FIG. 17, when the DMA transfer from the memory device 103 to the adaptor 102 is performed, at a time T1 when the transfer of a predetermined striping unit from the flash memory modules 1330 to 1333 is completed, the transfer from the adaptor 102 to the host PC 101 can be started. Thus, the latency time up to the acquirement of the data by the host PC 101 can be shortened.

Furthermore, according to the present embodiment, the transfer order in the respective flash memory modules of the memory device 103 is fixed, and the adaptor 102 can check the transfer progress in the region determining part 1325 for each flash memory module. With such a configuration, the time up to the start of transfer to the host PC 101 can be shortened, and transfer at a high-speed can be performed.

In the present embodiment, the four-module configuration has been described as the flash memory modules; however, configurations with other numbers of modules may be adopted.

Furthermore, in the present embodiment, the data of the address 0 is used as a predetermined striping unit; however, another striping unit may be adopted. For example, the data of the addresses 0 and 1 may be transferred from the adaptor 102 to the host PC 101 after the data of the addresses 0 and 1 are transferred from the memory device 103 to the adaptor 102.

Embodiment 7

Figure 18:
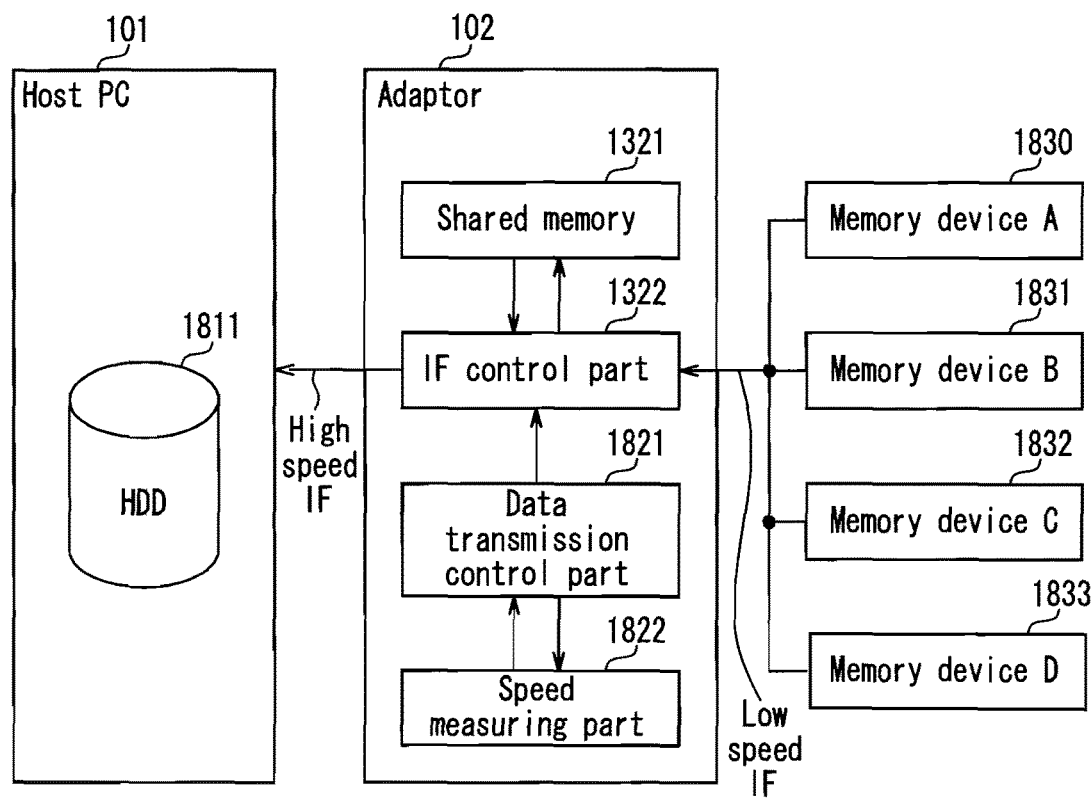
FIG. 18 is a block diagram showing the configuration of a memory device and a memory device controlling apparatus according to Embodiment 7.

FIG. 18 is a block diagram of a memory device and a memory device controlling apparatus in Embodiment 7 of the present invention.

A host PC 101 is an information processing apparatus typified by a personal computer or the like. An adaptor 102 can be connected to the host PC 101 and memory devices 1830 to 1833. The memory devices 1830 to 1833 contain a non-volatile memory such as a flash memory. The memory devices 1830 to 1833 only need to contain at least a memory element capable of writing or reading data.

The adaptor 102 includes a shared memory 1321, an interface control part 1322, a data transmission control part 1821, and a speed measuring part 1822. The shared memory 1321 is capable of sending/receiving data between the memory devices 1830 to 1833 and the host PC 101. The interface control part 1322 can control the connection between an interface on the host PC 101 side and an interface on the memory device 103 side. The data transmission control part 1821 transfers data in accordance with predetermined transfer conditions set in the host PC 101. The speed measuring part 1822 measures the transfer speed for each transfer condition of the data transmission control part 1821 and holds the measurement results. The adaptor 102 can be connected to all or at least one of a memory device A (1830), a memory device B (1831), a memory device C (1832), and a memory device D (1833).

The host PC 101 includes a hard disk drive (HDD) 1811. The HDD 1811 can accumulate not only data used in the host PC 101 but also data for transferring data between the host PC and the adaptor 102.

When the host PC 101 accesses a plurality of the memory devices 1830 to 1833, the data transmission control part 1821 transfers data from the memory devices 1830 to 1833 to the host PC 101 when the accesses from the memory devices 1830 to 1833 satisfy predetermined conditions. Specifically, the data transmission control part 1821 causes the data to be transmitted for a predetermined time slice interval by a timer and a predetermined data size. The speed measuring part 1822 changes the time slice interval or the data size in the data transmission control part 1821, and measures changes in the transfer speed to specify setting values (time slice interval, data size) from which performance can be extracted.

Figure 19:
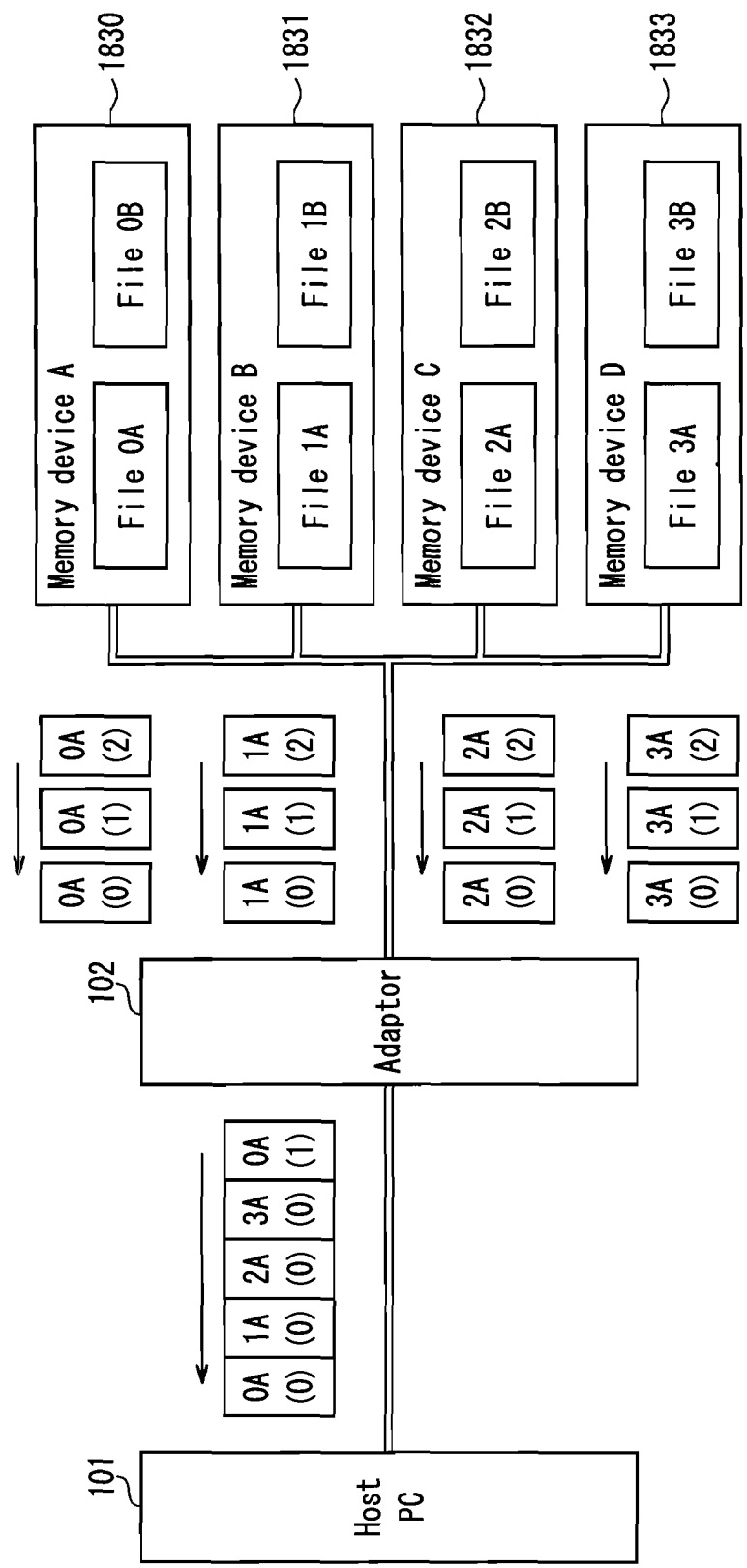
FIG. 19 is a schematic diagram illustrating the memory device and the memory device controlling apparatus according to Embodiment 7.

FIG. 19 is a block diagram showing the concept of data transfer. As shown in FIG. 19, the memory device A (1830) stores a file 0A and a file 0B. The memory device B (1831) stores a file 1A and a file 1B. The memory device C (1832) stored a file 2A and a file 2B. The memory device D (1833) stores a file 3A and a file 3B. FIG. 19 shows the flow of data when the host PC 101 reads the file 0A of the memory device A (1830), the file 1A of the memory device B (1831), the file 2A of the memory device C (1832), and the file 3A of the memory device D (1833) via the adaptor 102.

The files are divided depending upon the data transfer speed in buses or memory devices and buffer sizes of buses or memory devices and transferred to the adaptor 102. For example, the file 0A of the memory device A (1830) is divided into data 0A (0), data 0A (1), and data 0A (2) and transferred to the adaptor 102. The file 1A of the memory device B (1831) is divided into data 1A (0), data 1A (1), and data 1A (2) and transferred to the adaptor 102. The file 2A of the memory device C (1822) is divided into data 2A (0), data 2A (1), and data 2A (2), and transferred to the adaptor 102. The file 3A of the memory device D (1833) is divided into data 3A (0), data 3A (1) and data 3A (2), and transferred to the adaptor 102. The divided data is transferred from the adaptor 102 to the host PC 101 in an arrival order to the adaptor 102. In the example shown in FIG. 19, the data 0A (0), the data 1A (0), the data 2A (0), and the data 3A (0) are transferred to the host PC 101 in this order.

Figure 20:
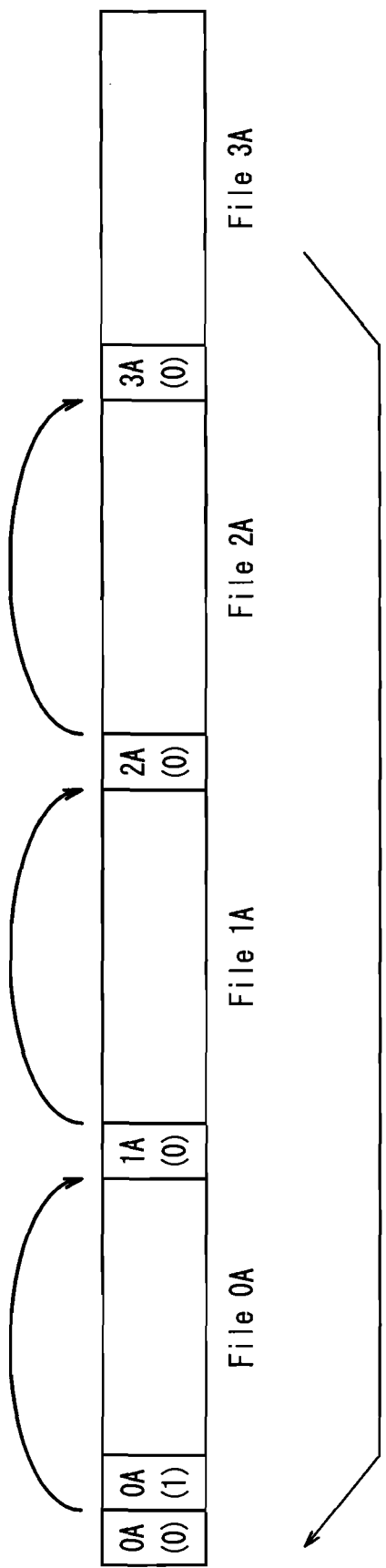
FIG. 20 is a schematic diagram showing the access order on a hard disk drive (HDD) of the memory device and the memory device controlling apparatus according to Embodiment 7.

FIG. 20 is a schematic view illustrating an access operation to the HDD 1811. The access operation of the HDD 1811 in the host PC 101 will be described with reference to FIG. 20. The files recorded in the HDD 1811 generally are placed continuously in memory regions in the HDD 1811. As shown in FIG. 20, physically continued regions such as the file 0A, the file 1A, the file 2A, and the file 3A are kept for the files recorded in the HDD 1811. When these files are accessed in the following order: the data 0A (0), the data 1A

(0), and the data 2A (0), ahead of the HDD 1811 moves (head seek) every time the head accesses each data. The head seek leads to a decrease in a data transfer speed since the physical movement of the head takes a long time.

Figure 21:
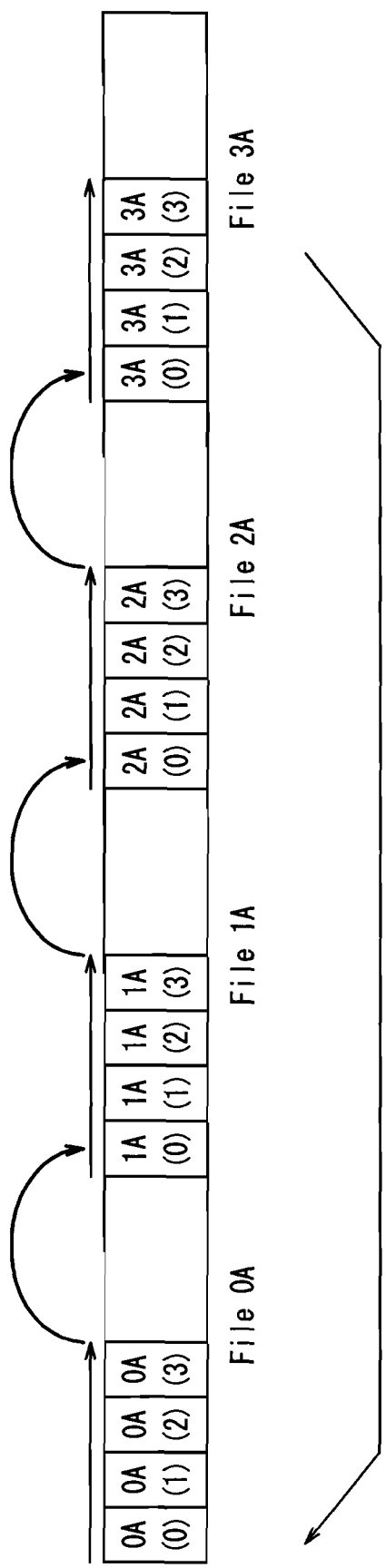
FIG. 21 is a schematic diagram showing the access order on the HDD of the memory device and the memory device controlling apparatus according to Embodiment 7.

FIG. 21 is a diagram illustrating the transfer operation when the data transmission control part 1821 transfers data while satisfying the predetermined conditions. As shown in FIG. 21, in the file 0A, the data 0A (0), the data 0A (1), the data 0A (2), and the data 0A (3) are transferred collectively. In the example shown in FIG. 21, after the transfer of the data 0A (0), the data 0A (1), the data 0A (2), and the data 0A (3) is completed, the head seek occurs. The accesses to the file 1A, the file 2A, and the file 3A are made simultaneously with the access to the file 0A. According to the access method shown in FIG. 21, the occurrence number of head seeks becomes ¼ of the occurrence number of head seeks in the accesses method shown in FIG. 20, which enhances the entire transfer speed.

According to the present embodiment, by providing the data transmission control part 1821 in the adaptor 102 and setting the conditions for the data transfer to the host PC 101, the decrease in a transfer speed can be minimized even if a device is provided in which a transfer time decreases due to the seek as in the HDD 1811 in the host PC 101.

Embodiment 8

Figure 22:
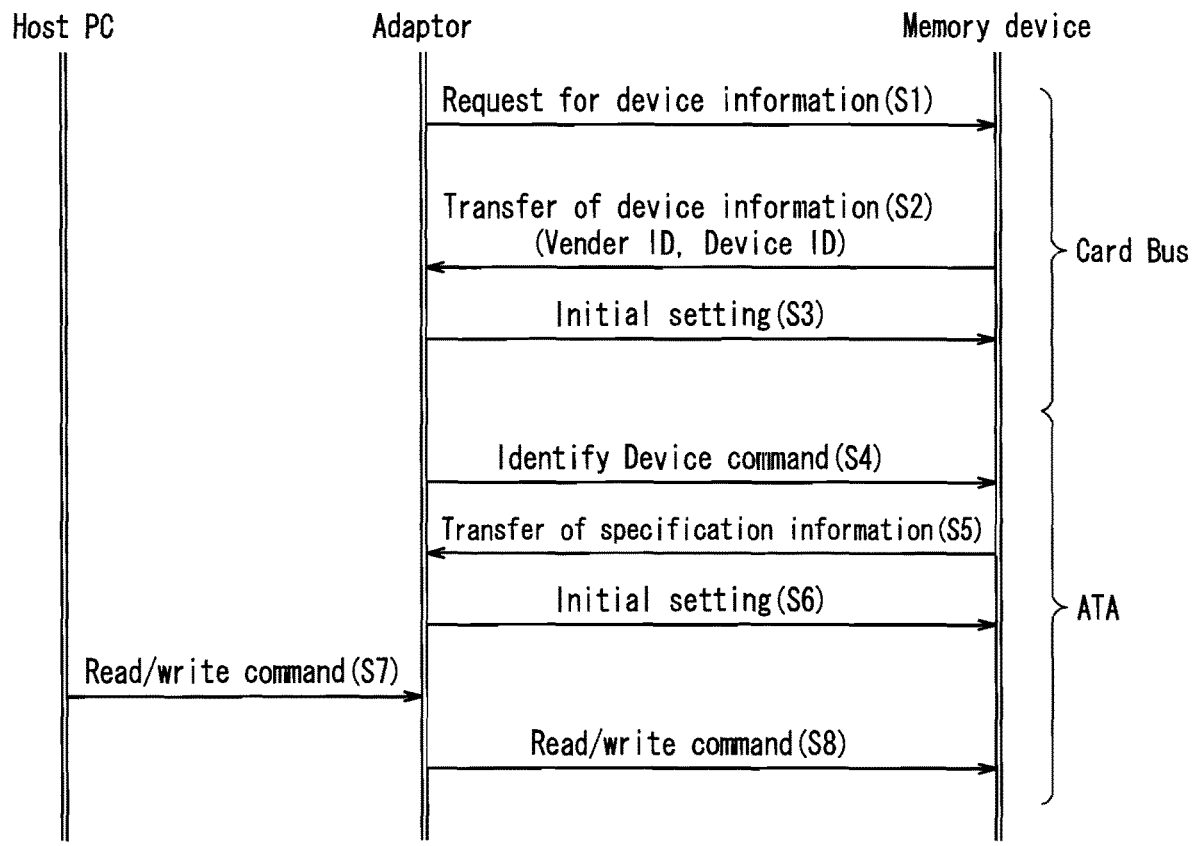
FIG. 22 is a timing chart showing a specific example of the data transfer between a memory device and a memory device controlling apparatus according to Embodiment 8.

FIG. 22 is a sequence diagram showing a specific example of a data transfer between a memory device and a memory device controlling apparatus according to Embodiment 8. FIG. 22 shows a specific example of the transmission/reception of a command and data mainly between the adaptor 102 and the memory device 103. The command and data shown in FIG. 22 are examples, and the present invention is not limited to the contents shown in FIG. 22. Furthermore, the sequence shown in FIG. 22 is applicable to the memory devices and the memory device controlling apparatuses according to Embodiments 1-7.

Figure 23:
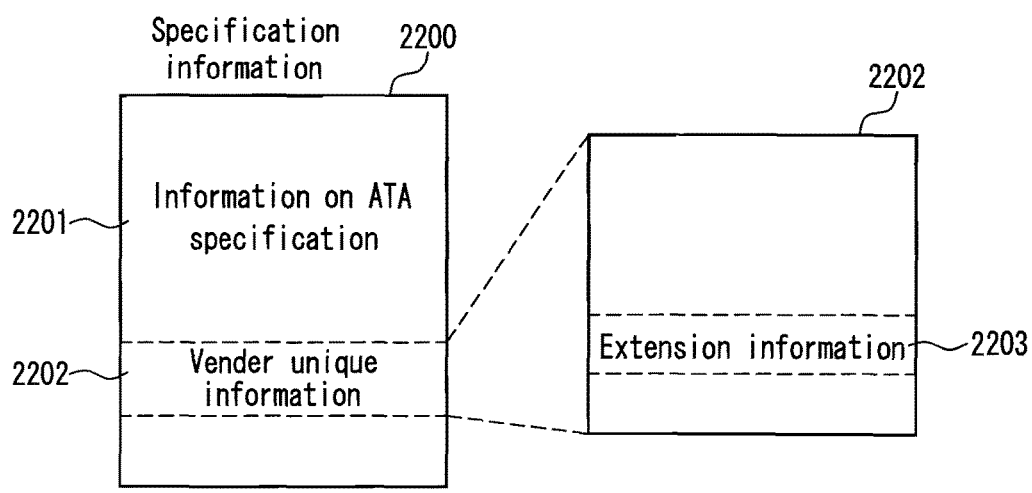
FIG. 23 is a schematic diagram showing the data structure of specification information.

FIG. 23 is a schematic diagram showing a data structure of specification information.

First, it is presumed that the host PC 101 and the adaptor 102 are connected to each other. The host PC 101 monitors the connection state of the memory device 103 in the adaptor 102 at intervals of a predetermined time (for example, one second). When the memory device 103 is connected to the adaptor 102, the adaptor 102 requests device information with respect to the memory device 103 (S1).

The memory device 103 issues device information if there is a request for the device information from the adaptor 102 (S2). The device information contains, for example, a vender ID and a device ID. The vendor ID is information unique to a vendor such as a vendor name of the memory device 103. The device ID is information unique to the device, such as number information and a serial number of the memory device.

When receiving the device information, the adaptor 102 starts initial setting of the memory device (S3). S1 to S3 are processes which establish the physical connection based on a CardBus specification.

Next, the adaptor 102 sends an Identify_Device command to the memory device 103 (S4).

The memory device 103 returns specification information 2200 to the Identify_Device command sent from the adaptor 102. The specification information 2200 contains information 2201 on an Advanced Technology Attachment (ATA) specification and a vendor-unique information 2202, as shown in FIG. 23. The information 2201 on the ATA specification contains information on a capacity of the memory device 103, version information of an ATA protocol, name information of a device, and the like. The vendor-unique information 2202 contains a bus width of data, stripe information, and the like. The vendor-unique information 2202 contains extension information 2203 as shown in FIG. 23. The extension information 2203 is a flag representing whether or not the memory device 103 is adaptable to the extension. The flag in the extension information 2203 being "1" shows that the memory device 103 is adaptable to the extension. The extension is a function operable at an operation frequency of, for example, 66 MHz.

The adaptor 102 performs initial setting based on the specification information sent from the memory device 103 (S6). The execution of S4 to S6 enables the host PC 101 to write data in the memory device 103 and to read data from the memory device 103. S4 to S6 are processes operated on the ATA specification.

Figure 24:
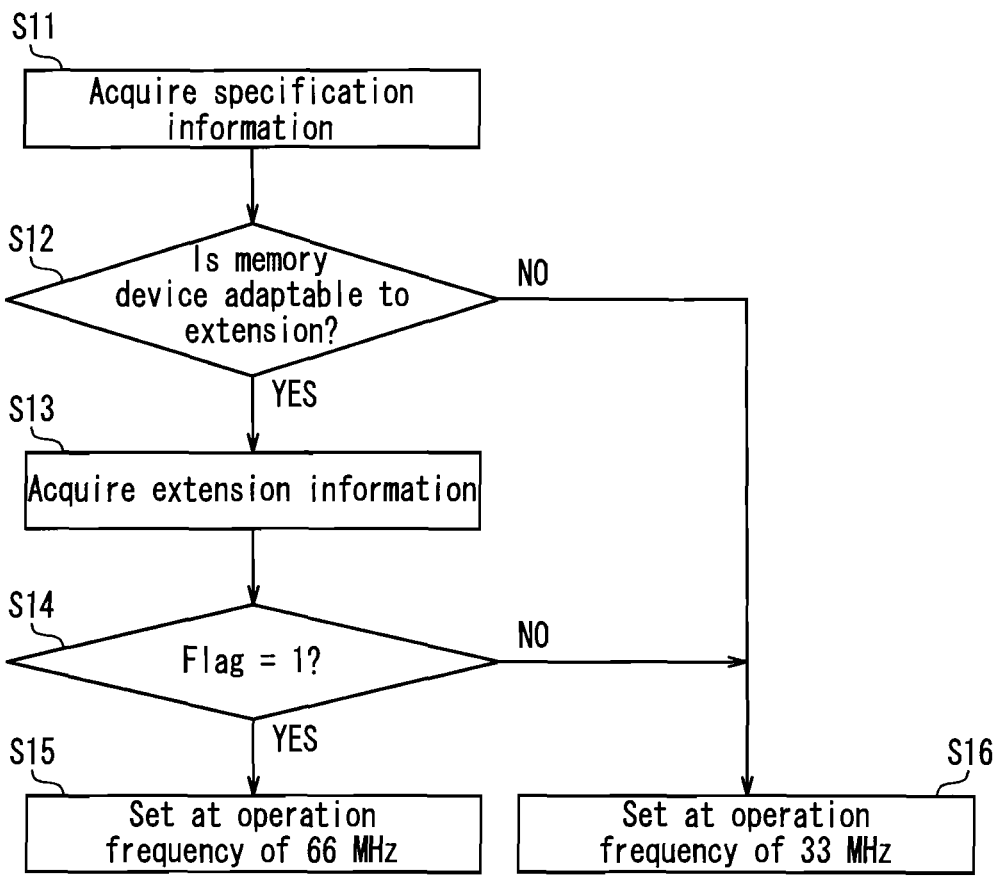
FIG. 24 is a flowchart showing the flow of activation of an extension.
Figure 25:
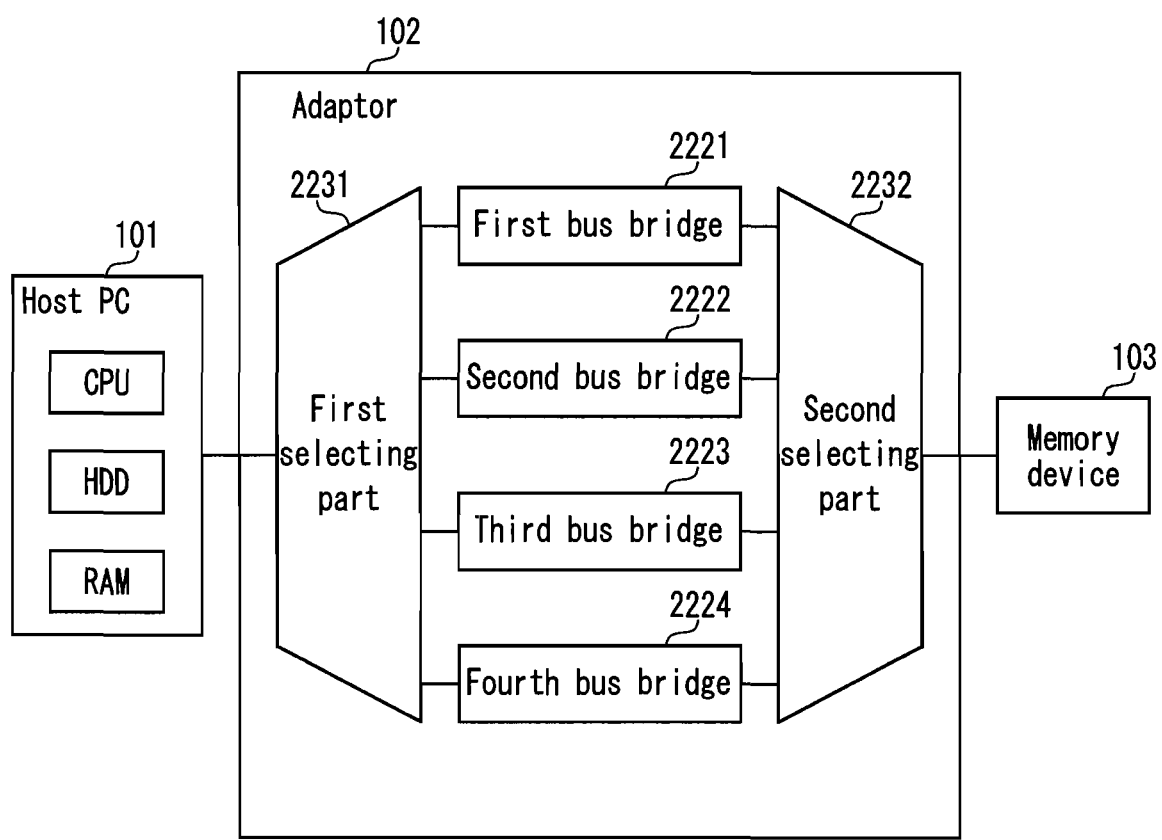
FIG. 25 is a block diagram of conventional memory device and memory device controlling apparatus.

FIG. 24 is a flowchart showing a process activating an extension. First, the adaptor 102 refers to the specification information of the connected memory device 103 (S11), and determines whether or not the connected memory device 103 is adaptable to the extension (S12). When determining that the memory device 103 is adaptable to the extension, the adaptor 102 refers to the extension information 2203 in the specification information 2200 (see FIG. 23) (S13). When determining that the flag of the extension information 2203 is "1" (YES in S14), the adaptor 102 activates the extension. Specifically, the adaptor 102 performs initial setting so that the memory device 103 is accessible at an operation frequency of 66 MHz (S15).

On the other hand, when determining that the connected memory device 103 is not adaptable to the extension (NO in S12), the adaptor 102 performs initial setting so that the memory device 103 is accessible at a default operation frequency of 33 MHz (S16). Furthermore, when determining that the flag of the extension information 2203 is "0" (NO in S14), the adaptor 102 performs initial setting so that the memory device 103 is accessible at a default operation frequency of 33 MHz (S16).

According to the present embodiment, when determining that the connected memory device 103 is adaptable to the extension, and the flag of the extension information is set to be "1", the adaptor 102 activates the extension and enables the memory device 103 to be accessible at an operation frequency of 66 MHz. Thus, the adaptor 102 can access the memory device 103 at an optimum operation frequency.

In the present embodiment, the adaptor 102 and the memory device 103 pursuant to the CardBus specification and the ATA specification have been described; however, the memory device and the memory device controlling apparatus of the present invention are not limited to these specifications.

When a memory device connected through an interface of a conventional standard PC or the like is connected through a higher-speed interface of the standard PC, the memory device and the memory device controlling apparatus according to the present invention can extract the performance of the standard PC and the memory device to the greatest extent. Thus, the present invention is useful as a memory device such as a non-volatile memory device used as a recording medium in a personal computer (PC), a digital camera, etc. and a memory device controlling apparatus.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A memory device controlling apparatus enabling a memory device having a plurality of memory modules to be detachable therefrom, the memory device controlling apparatus comprising:
   a device information requesting part that receives device information including a striping configuration from the memory device, when recognizing that the memory device is connected to the memory device controlling apparatus;
   an extension activating part that activates an extension of the memory device based on the device information acquired in the device information requesting part;
   a region determining part that determines a region where a data has been transferred from the memory device to the memory device controlling apparatus based on a striping basis of the striping configuration;
   a region counter that manages the data transferred from the memory device to the memory device controlling apparatus on the striping basis of the striping configuration; and
   an internal buffer,
   wherein the memory device controlling apparatus accesses the memory device using the extension selected based at least on an operable maximum frequency of a clock, a data size, and a maximum data bus width in the memory device, and
   wherein the striping configuration includes an information of an order of a plurality of data units that are segmented from the data and an address information of the data stored within the region of a plurality of memory modules of the memory device, and the striping size is a size of each of the data units,
   wherein the region determining part is configured to determine a region where the data has been transferred to the memory device controlling apparatus of one of a data unit previously stored in each of regions of each of the memory modules, and the region counter configured to manage the transferred data on the striping basis by setting up one or more flags representing a completion of transfer of the data unit,
   wherein each of the plurality of memory modules is non-volatile memory,
   wherein the memory device controlling apparatus is configured to receive the plurality of data units from the plurality of memory modules out of order, and
   wherein the memory device controlling apparatus manages the internal buffer based on a striping size of the striping configuration by using the region determining part and the region counter, and transfers the data from the memory device controlling apparatus to a host appliance.

2. The memory device controlling apparatus according to claim 1, wherein the memory device controlling apparatus is capable of being connected to the host appliance, and
   when a direct memory access (DMA) transfer from the memory device to the memory device controlling apparatus is performed, a transfer from the memory device controlling apparatus to the host appliance starts at a time when a transfer of a predetermined striping unit from the memory device is completed.

* * * * *